US012546922B2

(12) United States Patent
Jung et al.

(10) Patent No.: US 12,546,922 B2
(45) Date of Patent: Feb. 10, 2026

(54) OPTICAL FILTER WITH A STACKING STRUCTURE AND AN IMAGE CAPTURING DEVICE INCLUDING THE SAME

(71) Applicant: LMS CO., LTD., Pyeongtaek-si (KR)

(72) Inventors: Joon Ho Jung, Pyeongtaek-si (KR); Seon Ho Yang, Pyeongtaek-si (KR); Tae Jin Song, Pyeongtaek-si (KR); Chun Sik Kang, Pyeongtaek-si (KR); Sung Min Hwang, Pyeongtaek-si (KR); Choon Woo Ji, Pyeongtaek-si (KR); Ho Sung Lee, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 312 days.

(21) Appl. No.: 18/324,446

(22) Filed: May 26, 2023

(65) Prior Publication Data

US 2023/0417966 A1    Dec. 28, 2023

(30) Foreign Application Priority Data

Jun. 28, 2022    (KR) .......................... 10-2022-0079074

(51) Int. Cl.
  *G02B 5/20*    (2006.01)
  *H04N 25/13*   (2023.01)
(52) U.S. Cl.
  CPC ........... *G02B 5/208* (2013.01); *H04N 25/134* (2023.01)
(58) Field of Classification Search
  CPC ............................. G02B 5/208; H04N 25/134
  See application file for complete search history.

(56) References Cited

U.S. PATENT DOCUMENTS

| 10,808,081 B2 * | 10/2020 | Price ..................... C08J 3/124 |
| 2015/0260889 A1 | 9/2015  | Shiono et al. |
| 2018/0031745 A1 | 2/2018  | Kim et al. |
| 2023/0204835 A1* | 6/2023 | Heo ....................... G03B 17/12 |
| | | 359/359 |

FOREIGN PATENT DOCUMENTS

| CN | 111999790 A | 11/2020 |
| JP | 11281816 A | 10/1999 |
| JP | 2002267803 A | 9/2002 |
| JP | 2018510485 A | 4/2008 |
| JP | 2018180429 A | 11/2018 |
| JP | 2019159120 A | 9/2019 |
| JP | 2021015269 A | 2/2021 |
| KR | 20100137229 A | 12/2010 |

(Continued)

OTHER PUBLICATIONS

Office Action dated Jun. 11, 2024 for the corresponding Patent Application No. KR10-2022-0079074.

(Continued)

*Primary Examiner* — Joseph L Williams
(74) *Attorney, Agent, or Firm* — NKL LAW; Jae Youn Kim

(57) ABSTRACT

The present invention is to provide a stacked layer structure and an image capturing device having a high transmittance of visible light, capable of obtaining a sharp visible light transmission band while efficiently and accurately blocking ultraviolet light near the short wavelength region of the visible light and infrared light in the long wavelength region of the visible light, and preventing a flare phenomenon.

17 Claims, 13 Drawing Sheets

(56) References Cited

FOREIGN PATENT DOCUMENTS

| KR | 20150046016 A | 4/2015 |
| KR | 20150094631 A | 8/2015 |
| KR | 20180101761 A | 9/2018 |
| KR | 20220039397 A | 3/2022 |
| WO | 2014030628 A1 | 2/2014 |

OTHER PUBLICATIONS

Office Action dated Jun. 4, 2024 for the corresponding Patent Application No. JP2023-097070.

* cited by examiner

OPTICAL FILTER WITH A STACKING STRUCTURE AND AN IMAGE CAPTURING DEVICE INCLUDING THE SAME

FIELD

The present invention generally relates to an optical filter having a stacking structure and its application for an imaging capturing device.

BACKGROUND

An imaging capturing device is a device where a group of elements having a photoelectric conversion and an accumulation function, and a circuit having a scanning function to sequentially take out signal charges accumulated in each element are integrated into one structure. The imaging device basically includes a lens 10 for receiving external light, an optical filter 20 and an image sensor 30 as shown in FIG. 1.

In the above structure, the optical filter 20 is used to obtain good color reproducibility and clear images. Typically, the optical filter 20 is formed to have a function of transmitting visible light and shielding ultraviolet light and/or infrared light such as near-infrared light. A transmittance curve is required to show that the optical filter 20 transmits visible light and it blocks ultraviolet and infrared light at the same time.

However, it is not easy to build the optical filter 20 having high transmittance for visible light while blocking ultraviolet light near the short wavelength region of visible light and infrared light near the long wavelength region of visible light. As a known technique, having an absorption medium where a light absorption layer containing a near-infrared absorption dye is stacked on a substrate, an optical filter comprising a dielectric multilayer film for reflecting and/or blocking infrared light being stacked on both surfaces of the absorption medium is known. The conventional optical filter is disclosed in a prior art: Korean Patent Publication No. 10-2015-0094631.

Recently, in accordance with the trend of an image with high-pixel resolution, an image capturing device is required to embed a high-pixel resolution image sensor. As the image sensor becomes high-pixel resolution, the sensitivity and reflectivity of the near-infrared portion are increased, and thus the problem of generating a petal-shaped red flare in a photograph of a subject has become increasingly prominent. FIG. 2 is an image illustrating an example of a flare phenomenon. Referring to FIG. 2, a red band in the petal shape indicated by a white arrow is the flare phenomenon. Specifically, in the flare phenomenon, the near-infrared light incident from a light source is reflected on the surface of the image sensor whose sensitivity is improved due to the high-pixel resolution, and a dielectric multilayer film of the optical filter in contact with the image sensor reflects the reflected light again. Then, the reflected light hits the surface of the image sensor and is reflected once again, and this phenomenon is repeated over and over again.

Therefore, in consideration of the recent trend, it is necessary to build an absorption medium and an optical filter capable of preventing a flare phenomenon while having excellent optical properties.

SUMMARY

An object of the present invention is to provide a stacked layer structure and an image capturing device incorporating the stacked layer structure capable of obtaining a sharp visible light transmission band while having high visible light transmittance and efficiently and accurately blocking ultraviolet light near the short wavelength region of visible light and infrared light in the long wavelength region of visible light.

Another object of the present invention is to provide a stacked layer structure and an image capturing device incorporating the stacked layer structure capable of preventing a flare phenomenon.

According to an embodiment of the invention, there is provided that a stacked layer structure comprising a near-infrared absorption glass substrate and a light absorption layer having an average transmittance of 1% or less for light in a wavelength region of 720 to 780 nm.

In an embodiment, a transmittance of light at a wavelength of 750 nm is 1% or less for the stacked layer structure in the present invention.

In an embodiment, an absolute value of Ts1 is 1% or less from the General Formula (1): $Ts1=(T780-T720)/(780-720) \times 100$ for the stacked layer structure in the present invention where T780 means a transmittance for light at a wavelength of 780 nm, and T720 means a transmittance for light at a wavelength of 720 nm in the General Formula (1).

In an embodiment, an average transmittance for light in a wavelength region of 400 to 550 nm is 70% or more, and an average transmittance for light in a wavelength region of 750 to 1,000 nm is 5% or less for the stacked layer structure in the present invention.

In an embodiment, a wavelength ($\lambda_{cut-off}$) of light having a transmittance of 50% for light in a wavelength range of 500 to 750 nm is in a range of 600 to 640 nm for the stacked layer structure in the present invention.

In an embodiment, the near-infrared absorption glass substrate contains $Cu^{2+}$ in an amount of 1 to 10% by weight for the total weight for the stacked layer structure in the present invention.

In an embodiment, the near-infrared absorption glass substrate has an average transmittance of 80% or more for light in a wavelength region of 400 to 550 nm, and an average transmittance of 10% or less for light in a wavelength region of 750 to 1,000 nm for the stacked layer structure in the present invention.

In an embodiment, the light absorption layer has an average transmittance of 20% or less for light in a wavelength range of 700 to 800 nm for the stacked layer structure in the present invention.

In an embodiment, the light absorption layer includes a near-infrared absorbent for the stacked layer structure in the present invention.

In an embodiment, the near-infrared absorbent includes at least three absorbents selected from a group consisted of a first near-infrared absorbent having an absorption maximum wavelength in a range of 700 nm or more to 720 nm or less, a second near-infrared absorbent having an absorption maximum wavelength in a range of more than 720 nm to 740 nm or less, a third near-infrared absorbent having an absorption maximum wavelength in a range of more than 740 nm to 760 nm or less and a fourth near-infrared absorbent having an absorption maximum wavelength in a range of more than 760 nm to 800 nm or less for the stacked layer structure in the present invention.

In an embodiment, an optical density (OD) value of the first near-infrared absorbent included in the light absorption layer is in a range of 0.5 to 1.2, an OD value of the second near-infrared absorbent is in a range of 0.2 to 0.6, an OD value of the third near-infrared absorbent is in a range of 0.4 to 1.0, and an OD value of the fourth absorbent is in a range of 0.5 to 1.1 for the stacked layer structure in the present invention.

In an embodiment, a summed OD value of the near-infrared absorbents included in the light absorption layer is in a range of 2 to 3 for the stacked layer structure in the present invention.

In an embodiment, the light absorption layer has a full width half maximum of 120 nm or more for light in a wavelength range of 300 to 1,200 nm for the stacked layer structure in the present invention.

In an embodiment, the near-infrared absorbent includes one or more selected from a group consisted of a squarylium-based compound, a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound and an anthraquinone-based compound for the stacked layer structure in the present invention.

In an embodiment, the light absorption layer further comprises an ultraviolet absorbent for the stacked layer structure in the present invention.

In an embodiment, the ultraviolet absorbent includes at least one or more absorbent having an absorption maximum wavelength in a range of 350 nm or more to 400 nm or less for the stacked layer structure in the present invention.

In an embodiment, he stacked layer structure in the present invention also comprises one or more selected from a group consisted of a benzotriazole-based compound, a triazine-based compound, a benzophenone-based compound, an oxazole-based compound, a melocyanine-based compound, a cyanine-based compound, a naphthalimide-based compound, an oxadiazole-based compound, an oxazine-based compound, an oxazolidine-based compound, a naphthalic acid-based compound, a styryl-based compound, an anthracene-based compound, a circular carbonyl-based compound, an azomethine-based compound, an indole-based compound, a cyanoacrylate-based compound, an oxyanilide-based compound, and a triazole-based compound.

According to another embodiment of the invention, there is provided that an optical filter comprising a near-infrared absorption glass substrate, a light absorption layer and a dielectric multilayer film where a RGB value is extracted with a color picker tool for a photo taken according to the following shooting conditions, and an absolute value of the difference between the R value between the point with the smallest R value and the point with the largest R value in the photo is within the range of 0 to 50:
[Shooting Conditions]

Using a rear camera equipped with the optical filter, a halogen LED light source having a color temperature of 3,100K is used as an object, and the distance between the rear camera and the light source is 50 cm, and the photo is taken in a dark room.

In another embodiment, the absolute value of the difference between the R value and the G value at the point where the R value is the largest with respect to the RGB values extracted from the photographed picture is in the range of 0 to 50, and the absolute value of the difference between the R value and the B value is in the range of 0 to 50 for the optical filter in the present invention.

According to another embodiment of the invention, there is provided that an optical filter comprising a near-infrared absorption glass substrate, a light absorption layer and a dielectric multilayer film wherein the dielectric multilayer film includes a first dielectric multilayer film located on one side of the outermost surfaces of the optical filter and a second dielectric multilayer film located on the other side of the outermost surfaces of the optical filter wherein the first dielectric multilayer film has a wavelength ($\lambda_{R,\ cut\text{-}off}$) of light with a reflectivity of 50% for light in a wavelength range of 600 to 850 nm being in a range of 750 to 780 nm and an average transmittance of 10% or less for light in a wavelength range of 750 to 1,000 nm; and the second dielectric multilayer film has an average transmittance of 90% or more for light in a wavelength region of 750 to 1,000 nm and a maximum transmittance of 1% or less for light in a wavelength region of 730 to 780 nm.

In another embodiment, the first multilayer dielectric film has an average transmittance of 50% or more for light in a wavelength range of 700 to 750 nm for the optical filter in the present invention.

In another embodiment, the second multilayer dielectric film has an average reflectance of 1% or less for light in a wavelength region of 450 to 750 nm for the optical filter in the present invention.

In another embodiment, an average transmittance of 0.5% or less for light in a wavelength region of 730 to 780 nm for the optical filter in the present invention.

DETAILED DESCRIPTION

Figure 1:
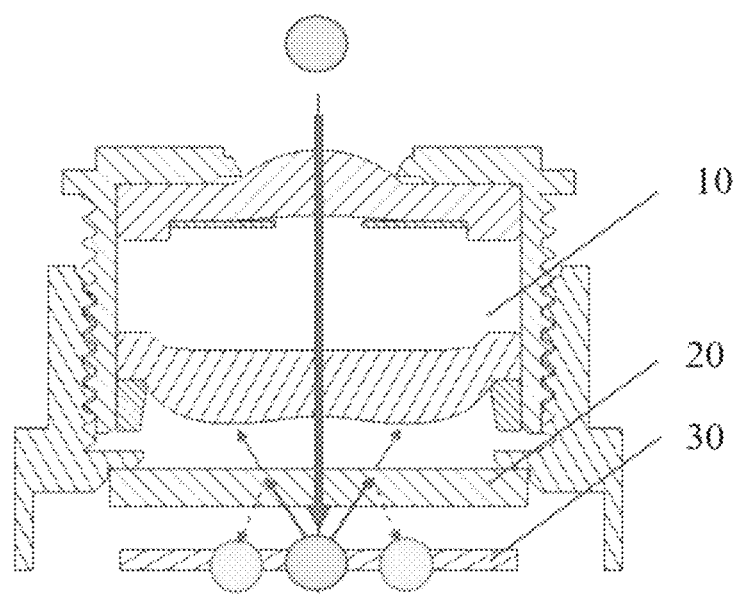
FIG. 1 shows a simple structure of an imaging capturing device.
Figure 2:
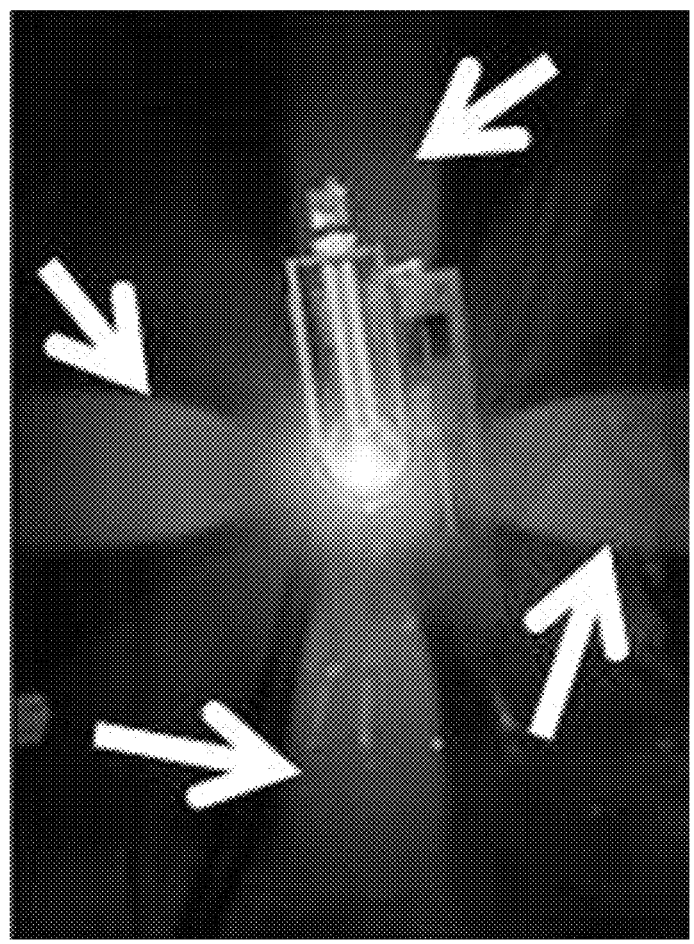
FIG. 2 is an image illustrating an example of a flare phenomenon.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

For those physical properties mentioned in the present invention where the result of measuring temperature and/or pressure may affect, it is measured at room temperature and/or atmosphere pressure unless otherwise specified. The term "room temperature" used in the present invention refers to a natural temperature that is not heated or not reduced, for example, it means any temperature within the range of 10° C. to 30° C., a temperature of about 23° C. or about 25° C. In addition, in the present specification, the unit of temperature is Celsius (C) unless otherwise specified.

The term "atmosphere pressure" is a natural pressure that is not pressurized or depressurized. It usually means about 1 atmosphere of atmospheric pressure. In the case of a physical property in which the measured humidity affects the result, the physical property is a physical property measured at natural humidity that is not specifically controlled at the room temperature and/or atmosphere pressure.

In the case where an optical characteristic (e.g., refractive index) referred to in the present invention is a characteristic that varies depending on the wavelength, the optical characteristic is a result obtained for light having a wavelength of 520 nm unless otherwise specified.

The term "refractive index" used in the present invention may be measured in a wavelength range of 400 to 1,200 nm at 25° C., and may mean a refractive index obtained for light having a wavelength of 520 nm unless otherwise specified.

The term "transmittance" used in the present invention means an actual transmittance (measured transmittance) confirmed at a specific wavelength unless otherwise specified. In addition, the term "reflectance" used in the present invention means an actual reflectance (measured reflectance) confirmed at a specific wavelength unless otherwise specified.

The term "transmittance" used in the present invention is a value measured using an ultraviolet and visible spectrophotometer and means the transmittance for light at an incident angle of 0° based on the normal of the measurement target surface unless the incident angle is specifically specified. In addition, the term "reflectance" used in this invention is a value measured using an ultraviolet and visible spectrophotometer, and unless the incident angle is specifically specified, it means the reflectance for light at an incident angle of 0° based on the normal of the measurement target surface.

The term "average transmittance" used in the present invention means a value calculated by a cubic spline regression equation using the Minitab Tool, a statistical analysis program, unless otherwise specified. In addition, unless otherwise specified, the term "average reflectance" used in the present application refers to a value calculated by a cubic spline regression equation using the Minitab Tool, a statistical analysis program, unless otherwise specified.

The term "maximum transmittance" (or highest transmittance) as used in the present invention means the highest transmittance among transmittances (measured transmittance) within a specific wavelength range unless otherwise specified, and the term "minimum transmittance" (or lowest transmittance) means the lowest transmittance among transmittances (measured transmittance) within a specific wavelength range unless otherwise specified.

The term "maximum reflectance" used in the present invention means the highest reflectance among reflectances (measured reflectance) within a specific wavelength range unless otherwise specified, and the term "minimum reflectance" means the lowest reflectance among reflectances (measured reflectance) within a specific wavelength range unless otherwise specified.

The term "incident angle" used in the present invention is an angle normal to a surface to be evaluated. For example, a transmittance at an incident angle of 0° of the optical filter means the transmittance for light incident in a direction parallel to the normal of the optical filter surface, and a transmittance at an incident angle of 40° is the transmittance for the incident light forming an angle of 40° in the clockwise or the counterclockwise direction with respect to the normal of the optical filter surface. This definition of the incident angle is equally applied to other characteristics such as transmittance.

The term "visible light" (or visible light) used in the present invention refers to light having a wavelength range of approximately 380 to 720 nm. In addition, the term "ultraviolet light" (or ultraviolet light) used in the present invention means light having a wavelength range of 10 nm or more and less than 380 nm. In addition, the term "infrared" (or infrared light) used in the present invention means light having a wavelength region of more than 720 nm and 1 mm, and the term "near-infrared" (or near-infrared light) means light having a wavelength region of more than 720 nm and 3 μm.

The term "light absorption" used in the present invention means absorbing light of a specific wavelength or a specific wavelength region. A stacked layer structure according to an embodiment of the present invention may include a near-infrared absorption glass substrate and a light absorption layer.

A near-infrared absorption glass substrate of a stacked layer structure according to an embodiment of the present invention may contain $Cu^{2+}$. Near-infrared light of at least a partial region may be absorbed through the $Cu^{2+}$. In addition, the near-infrared absorption glass substrate may contain $Cu^{2+}$ in an amount of 1 to 10% by weight ("wt %") with respect to the total weight. The content of $Cu^{2+}$ may be included in the infrared absorption glass by 1.5 wt % or more, 2 wt % or more, 2.5 wt % or more, or 3 wt % or more, or 9 wt % or less, 8 wt % or less, 7 wt % or less, 6 wt % or less or 5 wt % or less with respect to the total weight of the infrared absorption glass substrate.

Meanwhile, a near-infrared absorption glass substrate of the stacked layer structure according to an embodiment of the present invention may be $Cu^{2+}$-containing fluorophosphate glass or $Cu^{2+}$-containing phosphate glass. By using the near-infrared absorption glass substrate, it can have high transmittance for visible light and high shielding for near-infrared light. In addition, the $Cu^{2+}$-containing fluorophosphate glass and $Cu^{2+}$-containing phosphate glass may include silicophosphate glass where a part of the glass structure is composed of $SiO_2$.

In addition, a near-infrared absorption glass substrate may include $P^{5+}$ in an amount of 10 to 50% by weight with respect to the total weight. The content of $P^{5+}$ may be included in the glass by 12 wt % or more, 14 wt % or more, 16 wt % or more, 18 wt % or more, or 20 wt % or more, or 45 wt % or less, 40 wt % or less, or 35 wt % or less of the total weight of the infrared absorption glass substrate.

On the other hand, a near-infrared absorption glass substrate may further include $F^-$ in some cases. When the near-infrared absorption glass substrate further comprises $F^-$, the content of $F^-$ may be included in the glass by 15 wt % or less, 14 wt % or less, 13 wt % or less, 12 wt % or less, 11 wt % or less, or 10 wt % or less of the total weight of the infrared absorption glass substrate and the glass may also include 0.1 wt % or more or 0.5 wt % or more of the total weight of the infrared absorption glass substrate although the lower limit is not particularly limited.

Moreover, the near-infrared absorption glass may satisfy the amount of $F^-/Cu^{2+}$ being by 0.5 or more, 0.6 or more, 0.7 or more, or 0.8 or more, or 5 or less, 4.5 or less, 4 or less, or 3.5 or less with respect to the total weight of the glass. When the amount of $F^-/Cu^{2+}$ of the near-infrared absorption glass substrate satisfies the above range, excellent weather resistance may be secured.

The near-infrared absorption glass substrate of the stacked layer structure according to an embodiment of the present invention is not particularly limited as long as the amount of the above components is satisfied, for example, CD700 and CXA700 of HOYA, Japan, KF099 and ZF230 of PTOT, Taiwan, BG66 of SCHOTT, Germany can be used.

The amount ratio of the composition included in the near-infrared absorption glass substrate of the stacked layer structure according to an embodiment of the present invention may be measured by using wavelength-dispersive X-ray fluorescence (WD-XRF) spectroscopy or inductively coupled plasma (ICP) spectroscopy.

The near-infrared absorption glass substrate of the stacked layer structure according to an embodiment of the present invention has an average transmittance of 80% or more, 81% or more, 82% or more, 83% or more, 84% or more, 85% or more, 86% or more, 87% or more, or 88% or more for light having a wavelength region of 400 to 550 nm. The upper limit of the average transmittance for the light having a wavelength of 400 to 550 nm of the near-infrared absorption glass substrate is not particularly limited, but may be 100% or less, 99.99% or less, 99.9% or less, or 99% or less.

The near-infrared absorption glass substrate of the stacked layer structure according to an embodiment of the present invention has an average transmittance of 10% or less, 9% or less, 8% or less, 7% or less, 6% or less for light having a wavelength range of 750 to 1,000 nm 5% or less. The lower limit of the average transmittance for the light having a wavelength range of 750 to 1,000 nm of the near-infrared absorption glass substrate is not particularly limited, but may be 0% or more, 0.1% or more, or 0.5% or more.

Thickness of the near-infrared absorption glass substrate of the stacked layer structure according to an embodiment of the present application is not particularly limited, but considering the above-described optical properties, it may be 0.1 mm or more, 0.125 mm or more, 0.15 mm or more, 0.175 mm or more or 0.2 mm or more, or 0.5 mm or less, 0.4 mm or less or 0.3 mm or less.

A stacked layer structure according to an embodiment of the present invention may include a light absorption layer as described above. The light absorption layer may be present in a stacked layer formed on one or both surfaces of the near-infrared absorption glass substrate. Specifically, the stacked layer structure according to an embodiment of the present invention can be formed as a structure of near-infrared absorption glass substrate/light absorption layer, or light absorption layer A/near-infrared absorption glass substrate/light absorption layer B (here, light absorption layer A and light absorption layer B are independent, respectively). As described above, when the stacked layer structure according to an embodiment of the present invention includes the light absorption layers on the outermost both surfaces, one light absorption layer may be referred to as a light absorption layer A, and the other light absorption layer may be referred to as a light absorption layer B.

The light absorption layer of the stacked layer structure according to an embodiment of the present invention may be formed of a light absorption composition. Specifically, the light absorption layer may be formed by depositing the light absorption composition to one or both surfaces of the above-described near-infrared absorption glass substrate and drying it. At this time, the coating method is not particularly limited, and a coating method generally used in the art such as spin coating, die coating, roll coating, gravure coating, reverse coating, immersion coating or air knife coating may be used. The light absorption layer can be obtained by appropriately drying the deposited light absorption composition, for example, it can be obtained by coating a coating film on one surface through spin coating, and then by drying in an oven at the room temperature to 150° C., the room temperature to 120° C., or the room temperature to 40° C. for approximately 5 to 300 minutes. The light absorption composition may include a transparent resin, a near-infrared absorbent, and an ultraviolet absorbent included in the light-absorption layer to be described below.

The light absorption layer of the stacked layer structure according to an embodiment of the present application may mean a layer including a near-infrared absorbent and a transparent resin, and in some cases may mean a layer including a near-infrared absorbent, an ultraviolet absorbent, and a transparent resin. In addition, the light absorption layer may be cured as a layer where the near-infrared absorbent (in some cases, the ultraviolet absorbent is additionally included) is uniformly dispersed in the transparent resin. In addition, the light absorption layer may be formed by depositing the light absorption composition including the transparent resin and the near-infrared absorbent (in some cases, additionally including the ultraviolet absorbent) to a substrate and then drying it.

The light absorption layer of the stacked layer structure according to an embodiment of the present invention may include a near-infrared absorbent. In addition, the light absorption layer of the stacked layer structure according to an embodiment of the present invention may further include a UV absorbent. Here, the light absorption layer of the stacked layer structure according to another embodiment of the present invention may include a near-infrared absorption layer including a near-infrared absorbent and an ultraviolet absorption layer including a UV absorbent.

The term "near-infrared absorbent" used in the present invention means an absorbent having an absorption maximum wavelength in the near-infrared region. In addition, the near-infrared absorbent preferably has a high transmittance in the visible light region, and the transmittance may be about 80% or more, about 81% or more, about 82% or more, about 83% or more, about 84% or more, or about 85% or more.

The near-infrared absorbent that may be included in the light absorption layer of the stacked layer structure according to an embodiment of the present invention may be used without any particular limitation as long as it is used in the art, for example, it may include at least one selected from a group consisting of a squarylium-based compound, a cyanine-based compound, a phthalocyanine-based compound, a naphthalocyanine-based compound, a dithiol metal-complex compound, a diimonium-based compound, a polymethine-based compound, a phthalide compound, a naphthoquinone-based compound, and an anthraquinone-based compound.

The near-infrared absorbent included in the light absorption layer of the stacked layer structure according to an embodiment of the present invention may include three or more selected from a group consisted of a first near-infrared absorbent having an absorption maximum wavelength in a range of 700 nm or more to 720 nm or less; a second near-infrared absorbent having a absorption maximum wavelength in a range of more than 720 nm to 740 nm or less; a third near-infrared absorbent having an absorption maximum wavelength in a range of more than 740 nm to 760 nm or less; and a fourth near-infrared absorbent having an absorption maximum wavelength in a range of more than 760 nm to 800 nm or less.

A conventional optical filter designed a dielectric multilayer film to reflect light in a wavelength region of about 700 to 750 nm, but when it is used, there is a problem where a petal-shaped red flare is generated as described above. To improve this problem, the dielectric multilayer film of the optical filter is redesigned to transmit light having a wavelength range of about 700 to 750 nm, but in this case, the optical filter has the transmittance of about 2% for light having a wavelength of about 750 nm (about 730 to 780 nm wavelength range) thereby generating a secondary peak. The secondary peak causes unnecessary light absorption for photographing and results in bad image creation.

When an optical filter is manufactured by forming a dielectric multilayer film on a stacked layer structure according to an embodiment of the present invention where the stacked layer structure includes a light absorption layer comprising three or more selected from a group consisting of a first near-infrared absorbent, a second near-infrared absorbent, a third near-infrared absorbent, and a fourth near-infrared absorbent, the above-described secondary peak occurrence problem can be prevented. That is, when the optical filter is manufactured by designing the dielectric multilayer film to transmit light having a wavelength range of about 700 to 750 nm and applying it to the stacked layer structure according to an embodiment of the present invention, the problem of the occurrence of the secondary peak can be prevented. Through this, unnecessary light is blocked to prevent flare, consequently, the transmittance as to visible light is high, and a sharp visible light transmission band can be obtained while efficiently and accurately blocking ultraviolet light near the short wavelength region of visible light and infrared light near the long wavelength region of visible light. Finally, it is possible to obtain an image similar to the one that the human eye can see.

The absorption maximum wavelength of the absorbent as used in the present application means a wavelength where the transmittance of light is the lowest when light in the range of 250 to 1,300 nm is transmitted through a layer containing the absorbent. Here, the layer containing the absorbent may mean a layer where the absorbent is dispersed in a resin. In addition, the resin may mean a resin having a transmittance of at least 90% or more in the visible light region when cured to form a layer, and if it satisfies the transmittance in the visible light region such as an acrylic resin or a silicone resin, it can be used without particular limitation.

The first near-infrared absorbent may include at least one selected from the group consisting of a squarylium-based compound, a cyanine-based compound, and a phthalocyanine-based compound having an absorption maximum wavelength in a range of 700 nm or more to 720 nm or less. In addition, the first near-infrared absorbent included in the light absorption layer may have an optical density (OD) value in a range of 0.5 to 1.2 for light having an absorption maximum wavelength. In another example, the OD value of the first near-infrared absorbent may be 0.55 or more, 0.6 or more, 0.65 or more, 0.7 or more, 0.75 or more, 0.8 or more, 0.85 or more, 0.9 or more, or 0.95 or more, or 1.15 or less, 1.1 or less, 1.05 or less, or 1 or less.

The term "OD (optical density) value" used in the present invention may mean a negative value of a value obtained by taking a commercial logarithm of the value of the light energy (E1) after transmission with respect to the value of the light energy (E2) before transmission when the light with the absorption maximum wavelength of the absorbent is transmitted to the layer containing the absorbent. Specifically, the OD may be measured according to the following [OD Formula].

$$OD(\text{Optical Density})\text{value}=-\log_{10}(E1/E2) \quad \text{[OD Formula]}$$

The second near-infrared absorbent may include at least one selected from a group consisting of a squarylium-based compound, a cyanine-based compound, and a phthalocyanine-based compound having an absorption maximum wavelength of greater than 720 nm and 740 nm or less. In addition, the second near-infrared absorbent included in the light absorption layer may have an OD (optical density) value in a range of 0.2 to 0.6 for light having an absorption maximum wavelength. In another example, the OD value of the second near-infrared absorbent may be 0.25 or more, 0.3 or more, 0.35 or more, or 0.4 or more, or 0.55 or less, 0.5 or less, or 0.45 or less.

The third near-infrared absorbent may include at least one selected from a group consisting of a squarylium-based compound, a cyanine-based compound, and a phthalocyanine-based compound having an absorption maximum wavelength of greater than 740 nm and 760 nm or less. In addition, the third near-infrared absorbent included in the light absorption layer may have an OD (optical density) value in a range of 0.4 to 1 for light having an absorption maximum wavelength. In another example, the OD value of the third near-infrared absorbent may be 0.45 or more, 0.5 or more, 0.55 or more, or 0.6 or more, or 0.95 or less, 0.9 or less, 0.85 or less, 0.8 or less, 0.75 or less, 0.7 or less, or 0.65 or less.

The fourth near-infrared absorbent may include at least one selected from the group consisting of a squarylium-based compound, a cyanine-based compound, and a phthalocyanine-based compound having an absorption maximum wavelength in a range of greater than 760 nm to 800 nm or less. In addition, the fourth near-infrared absorbent included in the light absorption layer may have an OD (optical density) value in a range of 0.5 to 1.1 for light having an absorption maximum wavelength.

The OD value of each near-infrared absorbent may be different depending on the type, number and/or amount of the near-infrared absorbent included in the light absorption layer, and the light-absorption layer of the stacked layer structure according to an embodiment of the present invention includes at least three selected from a group consisted of a first near-infrared absorbent, a second near-infrared absorbent, a third near-infrared absorbent, and a fourth near-infrared absorbent, while satisfying the OD values of each of the near-infrared absorbents within the above-mentioned range, respectively, thereby unnecessary light is blocked, thus the flare phenomenon is prevented. Furthermore, the light absorption layer has high the visible light transmittance, and it is possible to obtain a sharp visible light transmission band while efficiently and accurately blocking infrared light in the long wavelength region of visible light, and an image similar to the human eye can be obtained.

The light absorption layer of the stacked layer structure according to an embodiment of the present invention may contain 0.1 parts by weight or more, 0.2 parts by weight or more, 0.3 parts by weight or more, 0.4 parts by weight or more, 0.5 parts by weight or more, 0.6 parts by weight or more, 0.7 parts by weight or more, 0.8 parts by weight or more, 0.9 parts by weight or more or 1.0 part by weight or more, or 3 parts by weight or less, 2.8 parts by weight or less, 2.6 parts by weight or less, 2.4 parts by weight or less, 2.2 parts by weight or less, 2.0 parts by weight or less, 1.8 parts by weight or less, 1.6 parts by weight or less, 1.4 parts by weight or less or 1.2 parts by weight or less of the near-infrared absorbent with respect to 100 parts by weight of the transparent resin. When the amount ratio of the near-infrared absorbent in the light absorption layer satisfies the above range, it is possible to obtain a sharp visible light transmission band while efficiently and accurately blocking infrared light in a long wavelength region of visible light.

A summed OD value of the near-infrared absorbent included in the light-absorption layer of the stacked layer structure according to an embodiment of the present invention may be in a range of 2 to 3. Here, the summed OD value of the near-infrared absorbents included in the light absorption layer may be 2.1 or more, 2.2 or more, 2.3 or more, 2.4 or more, 2.5 or more, 2.6 or more or 2.7 or more, or 2.95 or less, 2.9 or less, 2.85 or less, 2.8 or less or 2.75 or less. In addition, as described above, the light absorption layer of the stacked layer structure according to an embodiment of the present invention may include at least three selected from a group consisted of a first near-infrared absorbent, a second near-infrared absorbent, a third near-infrared absorbent, and a fourth near-infrared absorbent and by satisfying the total OD value of the near-infrared absorbents included in the light absorption layer within the above range, unnecessary light is blocked to prevent a flare phenomenon. The light absorption layer has high visible light transmittance, a sharp visible light transmission band can be obtained while effectively and accurately blocking ultraviolet light near the short wavelength region of visible light and infrared light in a long wavelength region of visible light, and an image similar to the human eye can be obtained.

The term "UV absorbent" used in the present invention refers to an absorbent having an absorption maximum wavelength in the ultraviolet region. In addition, the ultraviolet absorbent preferably has a high transmittance in the visible light region, and the transmittance may be about 80% or more, about 81% or more, about 82% or more, about 83% or more, about 84% or more, or about 85% or more.

The ultraviolet absorbent that may be included in the light absorption layer of the stacked layer structure according to an embodiment of the present invention may be used without any particular limitation as long as it is used in the art, for example, it may include at least one selected from a group consisted of a benzotriazole-based compound, a triazine-based compound, or a benzophenone-based compound, an oxazole-based compound, a melocyanine-based compound, a cyanine-based compound, a naphthalimide-based compound, an oxadiazole-based compound, an oxazine-based compound, an oxazolidine-based compound, a naphthalic acid-based compound, a styryl-based compound, an anthracene-based compound, a carbonyl-based compound, an azomethine-based compound, an indole-based compound, a cyanoacrylate-based compound, an oxyanilide-based compound, and a triazole-based compound.

The ultraviolet absorbent included in the light absorption layer of the stacked layer structure according to an embodiment of the present invention may include at least one selected from a group of an azomethine-based compound, an indole-based compound, a benzotriazole-based compound, a triazine-based compound, a cyanoacrylate-based compound and an oxyanilide-based compound having an absorption maximum wavelength in a range of 350 nm or more and 400 nm or less. When the absorption maximum wavelength of the ultraviolet absorbent satisfies the above range, it is possible to obtain a sharp visible light transmission band while efficiently and accurately blocking ultraviolet light in the vicinity of a short wavelength region of visible light.

In addition, the ultraviolet absorbent included in the light absorption layer may have an OD (optical density) value in the range of 0.8 to 1.5 for light having an absorption maximum wavelength. In another example, the OD value of the ultraviolet absorbent may be 0.85 or more, 0.9 or more, 0.95 or more, 1 or more, 1.05 or more, 1.1 or more, 1.15 or more, or 1.2 or more, or 1.45 or less, 1.4 or less, 1.35 or less, 1.3 or less, or 1.25 or less. When the OD value of the ultraviolet absorbent satisfies the above range, it is possible to obtain a sharp visible light transmission band while efficiently and accurately blocking ultraviolet light in the vicinity of a short wavelength region of visible light.

The light absorption layer of the stacked layer structure according to an embodiment of the present invention may contain 1.0 part by weight or more, 1.5 parts by weight or more, 2.0 parts by weight or more, 2.5 parts by weight or more or 3.0 parts by weight or more, or 5.0 parts by weight or less, 4.5 parts by weight or less, 4.0 parts by weight or less or 3.5 parts by weight or less of the ultraviolet absorbent with respect to 100 parts by weight of the transparent resin. When the amount ratio of the ultraviolet absorbent in the light absorption layer satisfies the above range, a sharp visible light transmission band can be obtained while efficiently and accurately blocking ultraviolet light near the short wavelength region of visible light, and it is possible to effectively prevent a purple fringe phenomenon (a purple band appearing at the edge of the subject) caused by changing of the transmittance curve near the short wavelength region of visible light.

In a case where a light absorption layer of the stacked layer structure according to an embodiment of the present invention includes a near-infrared absorbent and an ultraviolet absorbent at the same time, a ratio (ODNIR/ODUV) of a summed OD value (ODNIR) of the near-infrared absorbent included in the light absorption layer and a summed OD values (ODUV) of the ultraviolet absorbent included in the light absorption layer may be in the range of 1 to 3. The ratio (ODNIR/ODUV) may satisfy 1.2 or more, 1.4 or more, 1.6 or more, 1.8 or more, 2 or more, or 2.2 or more, or 2.9 or less, 2.8 or less, 2.7 or less, or 2.6 or less. When the light absorption layer satisfies the ratio (ODNIR/OD UV) within the above range, it blocks unnecessary light to prevent a flare phenomenon, and has high transmittance of visible light and it is possible to obtain a sharp visible light transmission band while effectively and accurately blocking ultraviolet light near the short wavelength region of visible light and infrared light in the long wavelength region and to obtain an image similar to the one that the human eye can see. In addition, if the summed OD value of the near-infrared absorbent included in the light absorption layer of the stacked layer structure according to an embodiment of the present invention is within the range of 2 to 3 and the ratio (ODNIR/ODUV) can be satisfied within the above range, a flare phenomenon can be prevented.

Here, the OD values mean each OD value for the compound if the number of compounds included in each of the near-infrared absorbent and the ultraviolet absorbent is one. For the case of including several compounds, the summed OD of all compounds included will be the value.

The light absorption layer of the stacked layer structure according to an embodiment of the present invention may include a transparent resin as described above. When the transparent resin is cured, the measured refractive index may be 1.4 or more, 1.45 or more, 1.5 or more, 1.55 or more or 1.6 or more, or 2.5 or less, 2.4 or less, 2.3 or less, 2.2 or less, 2.1 or less, or 2 or less. The light absorption layer of the stacked layer structure according to an embodiment of the present invention may contain 90 wt % or more, 91 wt % or more, 92 wt % or more, 93 wt % or more, 94 wt % or more, 95 wt % or more, 96 wt % or more, 97 wt % or more, 98 wt % or more, or 99 wt % or more of the transparent resin with respect to the total weight In addition, as the transparent resin, it may include at least one selected from a group consisted of polyacrylic resin, epoxy resin, ene-thiol resin, polycarbonate resin, polyether resin, polyarylate resin, polysulfone resin, polyethersulfone resin, polyparaphenylene resin, polyarylene ether phosphine oxide resin, polyimide resin, polyamideimide resin, polyolefin resin, cyclic olefin resin and polyester resin. Or, a resin having a transparent property in the art can be used without limitation.

In addition, the transparent resin has a glass transition temperature (Tg) of 100° C. or more, 110° C. or more, 120° C. or more, 130° C. or more, 140° C. or more, or 400° C. or less, 380° C. or less, 360° C. or less, or 340° C. or less. The glass transition temperature may be measured through differential scanning calorimetry (DSC). When the transparent resin has the above-described glass transition temperature, it is possible to prevent deformation due to the deposition temperature in a deposition process for forming a dielectric multilayer film to be described later.

Moreover, the transparent resin may have a transmittance of 70% or more, 75% or more, 80% or more, 85% or more, or 99% or less, or 95% or less at a thickness of 0.1 mm. When the transparent resin satisfies the transmittance described above, good transparency can be ensured as an optical filter to be described later.

As described above, the light absorption composition according to an embodiment of the present invention may include a near-infrared absorbent, and may further include a transparent resin and/or an ultraviolet absorbent. In addition, the light absorption composition may further include a solvent in some cases.

The light absorption composition may contain 90 wt % or more, 91 wt % or more, 92 wt % or more, 93 wt % or more, 94 wt % or more or 95 wt % or more of the transparent resin with respect to the total weight of the remaining components (based on the solid component) excluding the solvent. Or, it may contain 99 wt % or less, 98 wt % or less, 97 wt % or less, or 96 wt % or less of the transparent resin with respect to the total weight of the remaining components (based on the solid component) excluding the solvent.

The light absorption composition may contain 0.1 parts by weight or more, 0.2 parts by weight or more, 0.3 parts by weight or more, 0.4 parts by weight or more, 0.5 parts by weight or more, 0.6 parts by weight or more, 0.7 parts by weight or more, 0.8 parts by weight or more, or more, 0.9 parts by weight or more or 1.0 part by weight or more, or 3.0 parts by weight or less, 2.8 parts by weight or less, 2.6 parts by weight or less, 2.4 parts by weight or less, 2.2 parts by weight or less, 2.0 parts by weight or less, 1.8 parts by weight or less, 1.6 parts by weight or less, 1.4 parts by weight or less or 1.2 parts by weight or less of the near-infrared absorbent with respect to 100 parts by weight of the transparent resin.

In addition, the light absorption composition may contain 1.0 part by weight or more, 1.5 parts by weight or more, 2.0 parts by weight or more, 2.5 parts by weight or more or 3.0 parts by weight or more of the ultraviolet absorbent with respect to 100 parts by weight of the transparent resin. Or, it may contain 5.0 parts by weight or less, 4.5 parts by weight or less, 4.0 parts by weight or less or 3.5 parts by weight or less of the ultraviolet absorbent with respect to 100 parts by weight of the transparent resin.

The light absorption composition may use a ketone compound as a solvent. Through the ketone compound, the absorbents included in the light absorption composition may be uniformly dispersed or dissolved in the transparent resin to form a light absorption layer having a small difference in optical properties depending on positions. As the ketone compound, methyl ethyl ketone or methyl isobutyl ketone may be used. The light absorption composition may contain 100 parts by weight or more, 150 parts by weight or more, 200 parts by weight or more, 250 parts by weight or more, 300 parts by weight or more, 350 parts by weight or more, 400 parts by weight or more, 450 parts by weight or more or 500 parts by weight or more, or 5,000 parts by weight or less, 4,000 parts by weight or less, 3,000 parts by weight or less, 2,000 parts by weight or less, 1,000 parts by weight or less, 900 parts by weight or less, 800 parts by weight or less, 700 parts by weight or less or 600 parts by weight or less of the solvent with respect to 100 parts by weight of the transparent resin, but it is not particularly limited thereto.

The light absorption layer of the stacked layer structure according to an embodiment of the present invention may have a thickness of 1 μm or more, 1.2 μm or more, 1.4 μm or more, 1.6 μm or more, 1.8 μm or more, 2 μm or more, 2.2 μm or more, 2.4 μm or more, 2.6 μm or more, 2.8 μm or more or 3 μm or more. Or, it may have the thickness of 10 μm or less, 9.5 μm or less, 9 μm or less, 8.5 μm or less, 8 μm or less, 7.5 μm or less, 7 μm or less, 6.5 μm or less, 6 μm or less, 5.5 μm or less, 5 μm or less of 4.5 μm or less, 4 μm or less, or 3.5 μm or less.

The light absorption layer of the stacked layer structure according to an embodiment of the present invention may have one or more of the optical properties listed below. The optical properties of the light absorption layer may be achieved by a combination of the above-described transparent resin, a near-infrared absorbent, and an ultraviolet absorbent.

The light absorption layer of the stacked layer structure according to an embodiment of the present invention may have an average transmittance of 80% or more, 80.5% or more, 81% or more, 81.5% or more, 82% or more, 82.5% or more, 83% or more, 83.5% or more, or 84% or more for light in a wavelength region of 400 to 550 nm. When the light absorption layer of the stacked layer structure has an average transmittance within the wavelength region that satisfies the above range, high transmittance for visible light is secured, and excellent color reproducibility can be obtained.

The light absorption layer of the stacked layer structure according to an embodiment of the present invention may have an average transmittance of 20% or less, 19% or less, 18% or less, 17% or less, 16% or less, or 15% or less for light in a wavelength region of 700 to 800 nm. When the light absorption layer of the stacked layer structure has an average transmittance within the wavelength region that satisfies the above range, it is possible to prevent the occurrence of a secondary peak thereby preventing a flare phenomenon and obtaining an image similar to a human eye.

The light absorption layer of the stacked layer structure according to an embodiment of the present invention may have an average transmittance of 15% or less, 14.5% or less, 14% or less, 13.5% or less, 13% or less, 12.5% or less, or 12% or less for light in a wavelength region of 720 to 780 nm. When the light absorption layer of the stacked layer structure has an average transmittance within the wavelength region that satisfies the above range, it is possible to prevent the occurrence of a secondary peak thereby preventing a flare phenomenon and to obtaining an image similar to a human eye.

The light absorption layer of the stacked layer structure according to an embodiment of the present invention may have a transmittance of 15% or less, 14.5% or less, 14% or less, 13.5% or less, 13% or less, 12.5% or less, or 12% or less for 750 nm wavelength light. When the transmittance of the light absorption layer of the stacked layer structure satisfies the above range in the wavelength region, it is possible to prevent the occurrence of a secondary peak thereby preventing a flare phenomenon and obtaining an image similar to the human eye.

The light absorption layer of the stacked layer structure according to an embodiment of the present invention may have an absorption full width half maximum (FWHM) being in a range of 120 nm to 200 nm for light in a wavelength range of 300 to 1,200 nm. In another example, the absorption full width half maximum of the light absorption layer can be 125 nm or more, 130 nm or more, 135 nm or more, or 140 nm or more, or 190 nm or less, 185 nm or less, 180 nm or less, 175 nm or less, 170 nm or less, 165 nm or less, or less, 160 nm or less, 155 nm or less, 150 nm or less, or 145 nm or less. When the absorption full width half maximum of the light absorption layer is controlled within the above range, it is possible to prevent the occurrence of a secondary peak thereby preventing a flare phenomenon and obtaining an image having a shape similar to that of a human eye.

The stacked layer structure according to an embodiment of the present invention may have one or more of the optical properties listed below. The optical properties of the stacked layer structure may be achieved by a combination of a near-infrared absorption glass substrate and a light absorption layer.

The stacked layer structure according to an embodiment of the present invention may have an average transmittance of 1% or less, 0.95% or less, 0.9% or less, 0.85% or less, 0.8% or less, 0.75% or less, 0.7% or less, or 0.65% or less for light in a wavelength region of 720 to 780 nm. The lower limit of the average transmittance for light in the wavelength region of 720 to 780 nm corresponds to excellent physical properties as it approaches to 0%, and may be 0% or more, 0.01% or more, or 0.1% or more. If the average transmittance of the stacked layer structure for light in the wavelength region of 720 to 780 nm satisfies the above range, the above-described secondary peak occurrence problem can be prevented when an optical filter is manufactured by forming a multilayer dielectric film on the stacked layer structure. As a result, it blocks unnecessary light to prevent flare, high transmittance of visible light is achieved, and it is possible to obtain a sharp visible light transmission band while effectively and accurately blocking ultraviolet light near the short wavelength region of visible light and infrared light in the long wavelength region and to obtain an image similar to the one that the human eye can see.

The stacked layer structure according to an embodiment of the present invention may have a transmittance of 1.0% or less, 0.95% or less, 0.9% or less, 0.85% or less, 0.8% or less, 0.75% or less, 0.7% or less, 0.65% or less, 0.6% or less, 0.55% or less, 0.5% or less, 0.45% or less, 0.4% or less, or 0.35% or less for light of 750 nm wavelength. The lower limit of the transmittance for light of 750 nm corresponds to excellent physical properties as it approaches to 0%, and may be 0% or more, 0.01% or more, or 0.1% or more. If the transmittance of the stacked layer structure for light of 750 nm satisfies the above range, the above-described secondary peak occurrence problem can be prevented when an optical filter is manufactured by forming a multilayer dielectric film on the stacked layer structure. As a result, it blocks unnecessary light to prevent flare, high transmittance of visible light is achieved, and it is possible to obtain a sharp visible light transmission band while effectively and accurately blocking ultraviolet light near the short wavelength region of visible light and infrared light in the long wavelength region and to obtain an image similar to the one that the human eye can see.

The stacked layer structure according to an embodiment of the present invention may have an average transmittance of 70% or more, 71% or more, 72% or more, 73% or more, 74% or more, 75% or more, 76% or more, 77% or more, 78% or more, or 79% or more for light in a wavelength region of 400 to 550 nm. The upper limit of the average transmittance for light in the wavelength region of 400 to 550 nm corresponds to excellent physical properties as it approaches to 100%, and may be 100% or less, 99% or less, or 98% or less. When the average transmittance of the stacked layer structure for light in the wavelength region of 400 to 550 nm satisfies the above range, high transmittance for visible light is ensured, and excellent color reproducibility can be obtained.

The stacked layer structure according to an embodiment of the present invention may have an average transmittance of 5% or less, 4.9% or less, 4.8% or less, 4.7% or less, 4.6% or less, 4.5% or less, 4.4% or less, 4.3% or less, or 4.2% or less for light in a wavelength region of 750 to 1,000 nm. The lower limit of the average transmittance for light in the wavelength region of 750 to 1,000 nm corresponds to excellent physical properties as it approaches to 0%, and may be 0% or more, 0.01% or more, or 0.1% or more. When the average transmittance of the stacked layer structure for light in the wavelength region of 750 to 1,000 nm satisfies the above range, a sharp visible light transmission band can be obtained while efficiently and accurately blocking infrared light in a long wavelength region of visible light, and a similar type of image can be obtained as a human eye can see.

The stacked layer structure according to an embodiment of the present invention may have an absolute value of Ts1 according to the following General Formula 1 being 1% or less, 0.95% or less, 0.9% or less, 0.8 5% or less, 0.8% or less, 0.75% or less, 0.7% or less, 0.65% or less or 0.6% or less. When the absolute value of Ts1 according to General Formula 1 of the stacked layer structure satisfies the above range, the above-described secondary peak occurrence problem can be prevented when an optical filter is manufactured by forming a dielectric multilayer film on the stacked layer structure. Accordingly, it blocks unnecessary light to prevent flare, and has high visible light transmittance and efficiently and accurately blocks ultraviolet light near the short wavelength region of visible light and infrared light in the long wavelength region of visible light to obtain a sharp visible light transmission band. It is possible to obtain an image similar to the one that the human eye can see.

$$Ts1=(T780-T720)/(780-720)\times 100 \quad [\text{General Formula 1}]$$

In General Formula 1, T780 means transmittance for light having a wavelength of 780 nm, and T720 means transmittance for light having a wavelength of 720 nm.

In the stacked layer structure according to an embodiment of the present invention, a wavelength ($\lambda_{cut-off}$) of light having a transmittance of 50% for light in a wavelength region of 500 to 750 nm may be in a range of 600 to 640 nm. The wavelength ($\lambda_{cut-off}$) of the light having a transmittance of 50% for light in the wavelength region of 500 to 750 nm may be 605 nm or more, 610 nm or more, or 615 nm or more, or 635 nm or less, 630 nm or less, 625 nm or less, or 620 nm or less. When the wavelength ($\lambda_{cut-off}$) of the light having a transmittance of 50% for the light in the wavelength region of 500 to 750 nm for the stacked layer structure satisfies the above range, a sharp visible light transmission band can be obtained while it effectively and accurately blocks infrared light in the long wavelength region of visible light, and it is possible to obtain an image similar to the one that the human eye can see.

In the stacked layer structure according to an embodiment of the present invention, a wavelength ($\lambda_{cut-on}$) of light having a transmittance of 50% for light in a wavelength region of 300 to 450 nm may be in a range of 390 to 430 nm. The wavelength ($\lambda_{cut-on}$) of the light having a transmittance of 50% for light in the wavelength region of 300 to 450 nm may be 395 nm or more, 400 nm or more, 405 nm or more, 410 nm or less, or 425 nm or less, 420 nm or less, or 415 nm. When the wavelength ($\lambda_{cut-on}$) of the light having a transmittance of 50% for the light in the wavelength region of 300 to 450 nm for the stacked layer structure satisfies the above range, a sharp visible light transmission band can be obtained while it effectively and accurately blocks infrared light in the long wavelength region of visible light, and it is possible to obtain an image similar to the one that the human eye can see.

An optical filter according to an embodiment of the present invention may include a near-infrared absorption glass substrate, a light absorption layer, and a dielectric multilayer film. Here, the near-infrared absorption glass substrate and the light absorption layer are the same as those described in the above-described stacked layer structure according to an embodiment of the present invention, and thus the detailed description will be omitted.

A conventional optical filter was designed to have a dielectric multilayer film reflecting light in a wavelength region of approximately 700 to 750 nm. When it is used, there is a problem to see a petal-shaped red flare being generated as described above. To improve this problem, the dielectric multilayer film of the optical filter is redesigned to transmit light having a wavelength range of about 700 to 750 nm, but in this case, the optical filter generated a secondary peak having a transmittance of about 2% for light having a wavelength of about 750 nm (in a wavelength region of approximately 730 to 780 nm). Consequently, there is a problem to create an appropriate image because the optical filter absorbed unnecessary light for photographing.

In the optical filter according to an embodiment of the present invention, the dielectric multilayer film is designed to transmit light in the relevant wavelength region so that a red flare does not occur, and the dielectric multilayer film is formed on the stacked layer structure according to the embodiment of the present invention. Thus, secondary peaks that may occur due to the design of the multilayer film are also prevented, so that it is possible to obtain an image similar to the one that the human eye can see.

In the optical filter according to an embodiment of the present invention, a light absorption layer may be disposed on one or both surfaces of the near-infrared absorption glass substrate. In addition, the optical filter may have a dielectric multilayer film disposed on both outermost surfaces, one of which may be referred to as a first multilayer dielectric film and the other as a second multilayer dielectric film. In particular, when the optical filter has a light absorption layer located on one surface of the near infrared absorption glass substrate, the dielectric multilayer film in contact with the near infrared absorption glass substrate may be the first dielectric multilayer film, and the dielectric multilayer film in contact with the light absorption layer may be the second dielectric multilayer film. Here, the first dielectric multilayer film is called as an IR (Infrared) reflective layer, and the second dielectric multilayer film is called an AR (Anti-Reflection) layer.

In the first multilayer dielectric film according to an embodiment of the present invention, a wavelength ($\lambda_{R,\ cut-off}$) of light having a reflectance of 50% for light in a wavelength range of 600 to 850 nm may be in a range of 750 to 780 nm. By satisfying the wavelength ($\lambda_{R,\ cut-off}$) of the first multilayer dielectric film within the above range, it is possible to transmit near-infrared light generating a red flare.

In addition, the first dielectric multilayer film may have a wavelength of light having a reflectance of 50% for light having an incident angle of n degrees (where n is 30 or 40) in a wavelength range of 600 to 850 nm ($\lambda_{R,\ n/cut\text{-}off}$) being in a range of 700 to 760 nm. When the wavelength ($\lambda_{R,\ n/cut\text{-}off}$) of the first dielectric multilayer film satisfies within the above range, it is possible to transmit near-infrared light generating a red flare for light having an incident angle changed.

In addition, the first multilayer dielectric film may have an average transmittance of 10% or less, 9.5% or less, 9% or less, 8.5% or less, 8% or less, or 7.5% or less for light in a wavelength region of 750 to 1,000 nm. The lower limit of the average transmittance for the light in the wavelength region of 750 to 1,000 nm corresponds to excellent physical properties as it approaches to 0%, and may be 0% or more, 0.01% or more, or 0.1% or more. Such a characteristic of the first dielectric multilayer film may be referred to as a characteristic of an IR (Infrared) reflective layer. In addition, the first dielectric multilayer film may have an average transmittance of 5% or less, 4.5% or less, 4% or less, 3.5% or less, 3% or less, or 2.5% or less for light having an incident angle of n degrees (where n is 30 or 40) in a wavelength region of 750 to 1,000 nm. The lower limit of the average transmittance for the light having an incident angle of n degrees (where n is 30 or 40) in the wavelength region of 750 to 1,000 nm corresponds to excellent physical properties as it approaches to 0%, and may be 0% or more, 0.01% or more or 0.1% or more.

In addition, the first dielectric multilayer film has an average transmittance of 50% or more, 52% or more, 54% or more, 56% or more, 58% or more, 60% or more, 62% or more, or 64% or more for light in a wavelength region of 700 to 750 nm. The upper limit of the average transmittance for light in the wavelength region of 700 to 750 nm corresponds to excellent physical properties as it approaches to 100%, and may be 100% or less, 99% or less, or 98% or less. By satisfying the average transmittance of the first multilayer dielectric film for light in a wavelength region of 700 to 750 nm within the above range, near infrared light generating a red flare may be transmitted.

Also, the first multilayer dielectric film may include a dielectric multilayer film where a first dielectric layer having a refractive index in a range of 1.8 to 3.5 and a second dielectric layer having a refractive index in a range of 1.1 to 1.7 are alternately stacked. The refractive index of the first dielectric layer may be about 1.9 or more, 2 or more, 2.2 or more, 2.4 or more, 2.5 or more, or 2.55 or more, or 3.5 or less, 3.3 or less, 3.1 or less, 2.9 or less, or 2.7 or less. In addition, the refractive index of the second dielectric layer may be about 1.1 or more, 1.2 or more, 1.3 or more, or 1.4 or more, or 1.7 or less, 1.65 or less, 1.6 or less, 1.55 or less, or 1.5 or less. In addition, the ratio (n1/n2) of the refractive index of the first dielectric layer (n1) and the refractive index of the second dielectric layer (n2) is about 1.4 or more, 1.45 or more, 1.5 or more, 1.55 or more, 1.6 or more, or 1.65 or more, or 1.7 or more, or 2 or less, 1.95 or less, 1.9 or less, 1.85 or less, 1.8 or less, 1.75 or less, or 1.7 or less.

Moreover, in the first dielectric multilayer film, an appropriate material for the first dielectric layer and the second dielectric layer may be selected to satisfy the above-described range in consideration of the refractive indices of the near-infrared absorption glass substrate and the light absorption layer. $TiO_2$, $Ta_2O_5$, $Nb_2O_5$, $ZnS$ or $ZnSe$, etc. may be utilized as the first dielectric layer, and $SiO_2$ or fluoride such as $NasAl_3Fl_4$, $Na_3Al_3F_6$ or $MgF_2$, etc. may be utilized as the second dielectric layer. However, it is not particularly limited as long as it is used in the art. Furthermore, when the first multilayer dielectric film is in contact with the near-infrared absorption glass substrate, the dielectric layer contacting with the substrate in the first dielectric multilayer film may include a fluoride layer further comprising $NasAl_3Fl_4$, $Na_3Al_3F_6$ and/or $MgF_2$, etc. and may also include a stacked dielectric film where the first dielectric layer and the second dielectric layer are alternately stacked on the fluoride layer. By introducing the fluoride layer, the adhesion between the first dielectric multilayer film and the near-infrared absorption glass substrate may be further improved thereby enhancing durability of the optical filter.

In addition, in the first dielectric multilayer film, the thickness of each of the first and second dielectric layers may be adjusted according to the purpose, but the thickness of each layer independently can be 10 nm or more, 15 nm or more, 20 nm or more, 25 nm or more, 30 nm or more or more, 35 nm or more, 40 nm or more, 45 nm or more, 50 nm or more, 55 nm or more, 60 nm or more, 65 nm or more, 70 nm or more, 75 nm or more, or 80 nm or more, or 200 nm or less, 190 nm or less; 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less or less, 50 nm or less, 40 nm or less, 30 nm or less, 20 nm or less, or 15 nm or less.

Further, in the first dielectric multilayer film, the stacked dielectric film may have a number of layers within a range of 15 to 35 layers or 40 to 100 layers. Specifically, the total number of all layers of the first and second dielectric layers of the stacked dielectric film may be controlled to be 15 to 35 layers or 40 to 100 layers while alternately stacking first and second dielectric layers. When the first multilayer dielectric film is controlled within the above range, the above-described optical characteristics may be satisfied. In the first multilayer dielectric film, the stacked dielectric film may be in the range of 18 to 25 layers, and in another example, it may be in the range of 40 to 50 layers.

The second multilayer dielectric film according to an embodiment of the present invention may have an average transmittance of 90% or more, 91% or more, 92% or more, or 93% or more for light in a wavelength region of 750 to 1,000 nm. The upper limit of the average transmittance for the light in the wavelength region of 750 to 1,000 nm corresponds to excellent physical properties as it approaches to 100%, and may be 100% or less, 99% or less, or 98% or less. Such a characteristic of the second dielectric multilayer film may be referred to as a characteristic of an anti-reflection (AR) layer. In addition, the second dielectric multilayer film has an average transmittance of 90% or more, 91% or more, 92% or more, or 93% or more for light having an incident angle of n degrees (where n is 30 or 40) in a wavelength region of 750 to 1,000 nm. The upper limit of the average transmittance for the light having the incident angle of n degrees (where n is 30 or 40) in the wavelength region of 750 to 1,000 nm corresponds to excellent physical properties as it approaches to 100%, and may be 100% or less, 99% or less or 98% or less.

The second multilayer dielectric film according to an embodiment of the present invention may include a dielectric multilayer film where a first dielectric layer having a refractive index in a range of 1.8 to 3.5 and a second dielectric layer having a refractive index in a range of 1.1 to 1.7 are alternately stacked. The refractive index of the first dielectric layer may be about 1.9 or more, 2 or more, 2.2 or more, 2.4 or more, 2.5 or more, or 2.55 or more, or 3.5 or less, 3.3 or less, 3.1 or less, 2.9 or less, or 2.7 or less. In addition, the refractive index of the second dielectric layer may be about 1.1 or more, 1.2 or more, 1.3 or more, or 1.4 or more, or 1.7 or less, 1.65 or less, 1.6 or less, 1.55 or less, or 1.5 or less. In addition, the ratio (n1/n2) of the refractive index of the first dielectric layer (n1) and the refractive index of the second dielectric layer (n2) is about 1.4 or more, 1.45 or more, 1.5 or more, 1.55 or more, 1.6 or more, or 1.65 or more, or 1.7 or more, or 2 or less, 1.95 or less, 1.9 or less, 1.85 or less, 1.8 or less, 1.75 or less, or 1.7 or less.

In addition, in the second dielectric multilayer film, an appropriate material may be selected for the first dielectric layer and the second dielectric layer to satisfy the above-described range in consideration of the refractive indices of the near-infrared absorption glass substrate and the light absorption layer. $TiO_2$, $Ta_2O_5$, $Nb_2O_5$, ZnS or ZnSe, etc. may be utilized as the first dielectric layer, and $SiO_2$ or fluoride such as $NasAl_3F_4$, $Na_3AlF_6$ or $MgF_2$, etc. may be utilized as the second dielectric layer. However, it is not particularly limited as long as it is used in the art.

In addition, in the second dielectric multilayer film, the thickness of each of the first and second dielectric layers may be adjusted according to the purpose, but the thickness of each layer independently can be 5 nm or more, 10 nm or more, 15 nm or more, 20 nm or more, 25 nm or more or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, or 500 nm or less; 450 nm or less, 400 nm or less, 350 nm or less, 300 nm or less, 250 nm or less, 200 nm or less, 190 nm or less, 180 nm or less, 170 nm or less, 160 nm or less, 150 nm or less, 140 nm or less, 130 nm or less can be 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 15 nm or less.

Also, in the second multilayer dielectric film, the number of layers of the dielectric multilayer film is not particularly limited and may be designed and applied as necessary.

The second dielectric multilayer film according to an embodiment of the present invention can obtain excellent color reproducibility by significantly lowering the reflectance in the visible light region to secure high transmittance for visible light. The second multilayer dielectric film may have an average reflectance of 1% or less, 0.9% or less, 0.8% or less, 0.7% or less, 0.6% or less, 0.5% or less, or 0.4% or less for light in a wavelength region of 450 to 750 nm. The lower limit of the average reflectance for the light in the wavelength region of 450 to 750 nm corresponds to excellent physical properties as it approaches to 0%, and may be 0% or more, 0.01% or more, or 0.1% or more. In addition, the second dielectric multilayer film may have an average reflectance of 1.0% or less, 0.9% or less, 0.8% or less, 0.7% or less, 0.6% or less, 0.5% or less, 0.4% or less, 0.3% or less, or 0.2% or less for light having an incident angle of n degrees (where n is 30 or 40) in a wavelength region of 450 to 750 nm. Because the second multilayer dielectric film lowers the average reflectance for the light in the wavelength region of 450 to 750 nm, high transmittance for light having an incident angle changed is achieved thereby obtaining excellent color reproducibility.

As described above, the second multilayer dielectric film may have 2 to 15 layers, 3 to 14 layers, 4 to 13 layers, 5 to 12 layers, 6 to 11 layers, or 7 to 10 layers to lower the average reflectance of light in a wavelength region of 450 to 750 nm.

In the first and second dielectric multilayer films of the optical filter according to an embodiment of the present invention, other dielectric layers may be included in addition to the first and second dielectric layers of the above-described stacked dielectric film, and the ratio of the total number of the first and second dielectric layers to the total number of the stacked dielectric film in the first and second dielectric multilayer films may be 80% or more, 85% or more, 90% or more, 95% or more, and the optical filter may be formed of only the first and second dielectric layers.

A method of forming the dielectric multilayer film of the optical filter according to an embodiment of the present invention is not particularly limited, and may be formed, for example, by applying a publicly known deposition method.

The optical filter according to an embodiment of the present invention may have a maximum transmittance of 1% or less, 0.9 5% or less, 0.9% or less, or 0.85% or less for light in a wavelength region of 730 to 780 nm. The optical filter prevents a flare phenomenon by controlling the maximum transmittance of the light in the wavelength region of 730 to 780 nm within the above range thereby obtaining an image similar to the one that the human eye can see.

In addition, the optical filter according to an embodiment of the present invention may have an average transmittance of 0.5% or less, 0.48% or less, 0.46% or less, 0.44% or less, 0.42% or less, 0.4% or less, 0.38% or less, 0.36% or less, 0.34% or less, 0.32% or less, or 0.3% or less for light in a wavelength region of 730 to 780 nm. The optical filter controls the average transmittance of the light in the wavelength region of 730 to 780 nm within the above range to prevent a flare phenomenon, thereby obtaining an image similar to the one that the human eye can see.

The optical filter according to an embodiment of the present invention may satisfy one or more, two or more, three or more, or all selected from a group consisted of the following conditions (1) to (4). When the optical filter satisfies one or more, two or more, three or more or all selected from the group consisted of the following conditions (1) to (4), unnecessary light is blocked to prevent a flare phenomenon, and the transmittance of visible light is high, thus, it is possible to obtain a sharp visible light transmission band while efficiently and accurately blocking ultraviolet light near the short wavelength region of visible light and infrared light in the long wavelength region of visible light, and to obtain an image similar to the one that the human eye can see.

(Condition 1) An average transmittance for light in a wavelength region of 430 to 565 nm may be 85% or more, and a minimum transmittance to light in a wavelength region of 430 to 565 nm may be 75% or more. Here, the average transmittance is 86% or more, 87% or more, 88% or more, 89% or more, or 90% or more, or the upper limit is not particularly limited and may be 100% or less, 99.9% or less, or 99% or less. In addition, the minimum transmittance is 76% or more, 77% or more, or 77.5% or more, or the upper limit is not particularly limited and may be 100% or less, 99.9% or less, or 99% or less.

(Condition 2) An average transmittance for light in a wavelength region of 700 to 725 nm may be 5% or less. Here, the average transmittance is 4.5% or less, 4% or less, 3.5% or less, 3% or less, or 2.8% or less, or the lower limit is not particularly limited and may be 0% or more, 0.1% or more, or 0.5% or more.

(Condition 3) An average transmittance for light in a wavelength region of 800 to 1,000 nm may be 3% or less. Here, the average transmittance is 2.9% or less, 2.8% or less, 2.7% or less, or 2.6% or less, or the lower limit is not particularly limited and may be 0% or more, 0.01% or more, or 0.1% or more.

(Condition 4) A wavelength ($\lambda_{F,\,cut\text{-}on}$) having a transmittance of 50% for the light in a wavelength region of 350 to 450 nm may be in the range of 390 to 420 nm. Here, when there are several wavelengths having a transmittance of 50% for the light having the wavelength range, the smallest wavelength among them may be the wavelength ($\lambda_{F,\,cut\text{-}on}$) having the transmittance of 50% for the light in the wavelength range of 350 to 450 nm. In addition, the wavelength ($\lambda_{F,\,cut\text{-}off}$) having a transmittance of 50% for light in the wavelength region of 600 to 700 nm may be in the range of 610 to 640 nm. Here, when there are several wavelengths having a transmittance of 50% for the light having the wavelength range, the largest wavelength among them is the wavelength ($\lambda_{F,\,cut\text{-}off}$) having the transmittance of 50% for the light in the wavelength range of 600 to 700 nm.

An absolute value of 2d, cut-off according to the following General Formula 2 for the optical filter according to an embodiment of the present invention may be 15 nm or less, 14.5 nm or less, 14 nm or less, 13.5 nm or less, 13 nm or less, 12.5 nm or less, 12 nm or less, 11.5 nm or less, 11 nm or less, 10.5 nm or less, 10 nm or less, 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less; 3 nm or less. If the absolute value of $\lambda_{d,\,cut\text{-}off}$ according to the following General Formula 2 for the optical filter satisfies the above range, excellent color reproducibility can be obtained even for light having an incident angle changed.

$$\lambda_{d,cut\text{-}off} = \lambda_{F,cut\text{-}off} - \lambda_{F,n/cut\text{-}off}$$ [General Formula 2]

In General Formula 2, $\lambda_{F,\,cut\text{-}off}$ is a wavelength when a transmittance is 50% for light having an incident angle of 0° in a wavelength region of 600 to 700 nm, and $\lambda_{F,\,n/cut\text{-}off}$ is a wavelength when a transmittance is 50% for light having an incident angle of n degrees in a wavelength region of 600 to 700 nm, and n is 30 or 40.

The optical filter according to an embodiment of the present invention extracts RGB values with a color picker tool from a photo taken according to the following shooting conditions, but an absolute value of the difference between the R value of the point with the smallest R value and the point with the largest R value in the photo may be in the range of 0 to 50, 0 to 45, 0 to 40, 0 to 35 or 0 to 30. On the other hand, when the absolute value of the difference between the R values is out of the above range, it can be considered that a flare phenomenon has occurred.

[Shooting Conditions]

Using a rear camera equipped with the optical filter, a halogen LED light source having a color temperature of 3,100K was used as an object. The distance between the rear camera and the light source was 50 cm, and the photo was taken in a dark room. Meanwhile, the photo may be taken within a radius of 1 m or less for the light source.

The darkroom means a substantially darkroom even if it is not completely dark. When RGB values are extracted with the color picker tool from the photo taken under the shooting conditions, the RGB values may be satisfied the range of 0 to 50, 0 to 40, 0 to 30, 0 to 20, or 0 to 15, respectively.

In addition, the absolute value of the difference between the R value and the G value at the point where the R value is the largest for the RGB values extracted from the photographed photo by the optical filter may be 0 to 50, 0 to 45, 0 to 40, 0 to 35, 0 to 30, 0 to 25, 0 to 20, 0 to 15, 0 to 10 or 0 to 5, the absolute value of the difference between the R value and the B value may be 0 to 50, 0 to 45, 0 to 40, 0 to 35, 0 to 30, 0 to 25, 0 to 20, 0 to 15, 0 to 10 or 0 to 5. On the other hand, when the absolute value of the difference between the R value and the G value and the absolute value of the difference between the R value and the B value at the point where the R value is the largest are out of the above ranges, it can be considered that a flare phenomenon has occurred. Thus, it can be seen that the flare phenomenon can be prevented when the relationship between RGB extracted by the optical filter according to an embodiment of the present invention for a photograph taken according to the photographing conditions is within the above range.

Below, the present invention will be described with reference to Embodiments and Comparative Examples, but the scope of the present invention is not limited by the contents presented below.

Method of Measuring Physical Properties

1. Evaluation of Refractive Index

The refractive index was measured at room temperature with light for a wavelength of 520 nm using an ellipsometer (M-2000® Ellipsometer) of WizOptics.

2. Transmittance and Reflectance Evaluation

For the measurement specimen, transmittance and reflectance were measured using a spectrophotometer (Supplier: Perkinelmer, Product Name: Lambda750 Spectrophotometer). Transmittance was measured for each wavelength and incident angle following the manual of the equipment, and the reflectance was measured for each wavelength following the manual of the equipment. The measurement specimen was positioned on a straight line between the measurement beam of the spectrophotometer and the detector, and the transmittance and reflectance were measured while changing the incident angle of the measurement beam from 0° to 40°. Here, the meaning that "the incident angle is 0°" means a direction parallel to the surface normal direction of the measurement specimen.

Preparation of Elements

1. Near-Infrared Absorption Glass Substrate

A Near-infrared absorption glass substrate contains positive ions being that the amount of $Cu^{2+}$ is 3 to 5 wt %, the amount of $P^{5+}$ is 20 to 30 wt %, and the amount of $F^-$ is 1 to 10 wt % with respect to the total weight, and the amount of $F^-$/the amount of $Cu2^+$ was about 1.43.

In addition, the near-infrared absorption glass substrate has a thickness of 0.21 mm, an average transmittance of 88% or more for light having a wavelength range of 400 to 550 nm, and an average transmittance of 5% or less for light having a wavelength range of 750 to 1,000 nm.

Figure 3:
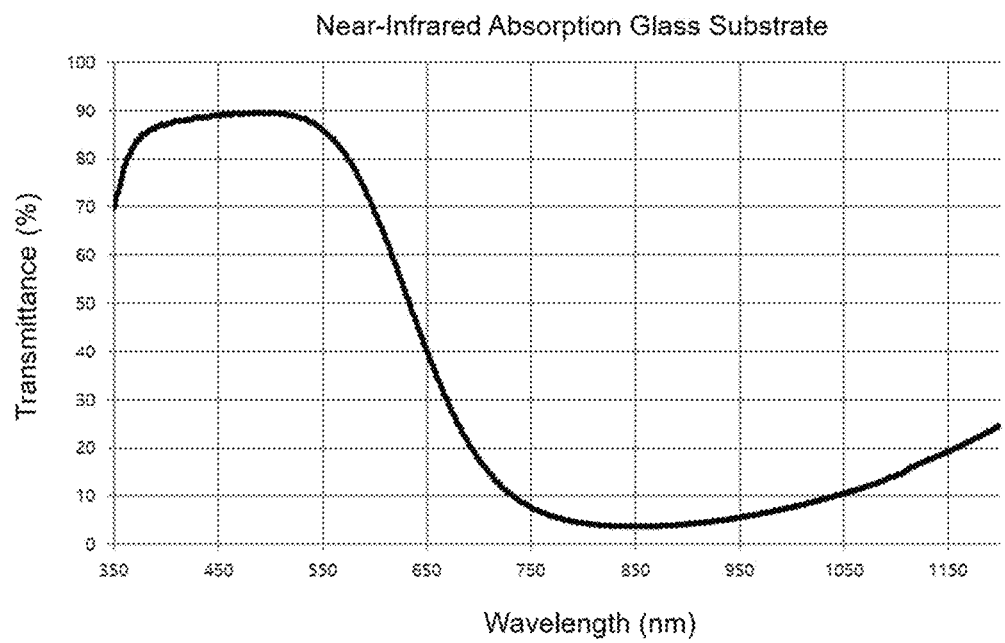
FIG. 3 is a graph showing optical properties (a transmittance graph) of a near-infrared absorption glass substrate according to an embodiment of the present invention.

The optical properties of the used near-infrared absorption glass substrate (a transmittance graph) are shown in FIG. 3.

2. Light Absorption Composition (1) Preparation Example of Light Absorption Composition A A light absorption composition A was prepared by mixing polyacrylic resin (Supplier: Sumitomo Corporation, product name: SUMIPEX, refractive index about 1.6); a squarylium-based compound having an absorption maximum wavelength of about 700 nm to 710 nm as a first near-infrared absorbent (IA1) (Supplier: Exciton, Product Name: IRA705); a cyanine-based compound having an absorption maximum wavelength of about 730 nm or more to 740 nm or less as a second near-infrared absorbent (IA2) (supplier: FEW CHEMICALS, Product Name: S2364); a cyanine-based compound having an absorption maximum wavelength of greater than about 740 nm and 750 nm or less as a third near-infrared absorbent (IA3) (Supplier: FEW CHEMICALS, Product Name: S2137); a squarylium-based compound having an absorption maximum wavelength of about 770 nm or more to 780 nm or less as a fourth near-infrared absorbent (IA4) (FEW CHEMICALS, Product Name: S2404); and a benzotriazole-based compound (supplier: ZICO, product name: ZIKA-480) having an absorption maximum wavelength of about 360 nm as a UV absorbent (UA) in a weight ratio of 100:0.2:0.01:0.2:0.6:3.5 (SUMIPEX: IRA705: S2364: S2137: S2404: ZIKA-480) and appropriately adding methylisobutyl ketone (K) as a solvent.

(2) Comparative Preparation Example of Light Absorption Composition B

A light absorption composition B was prepared by mixing polyacrylic resin (Supplier: Sumitomo, product name: SUMIPEX, refractive index about 1.6); a squarylium-based compound having an absorption maximum wavelength of 700 to 710 nm as a first near-infrared absorbent (IA1) (Supplier: Exciton, Product Name: IRA705); a second near-infrared absorbent (IA2) as a cyanine-based compound having an absorption maximum wavelength of 730 to 740 nm (Supplier: FEW CHEMICALS, Product Name: S2364); and a benzotriazole-based compound having an absorption maximum wavelength of 360 nm as an ultraviolet absorbent (UA) (Supplier: ZICO, product name: ZIKA-480) in a weight ratio of 100:1.3:1.5:4.4:450 (SUMIPEX: IRA705: S2364: ZIKA-480), and appropriately adding methylisobutyl ketone (K) as a solvent.

A. Preparation of Stacked Layer Structure (A)

1. Embodiment A1

A stacked layer structure is prepared by depositing a certain amount of the light absorption composition A prepared according to the preparation example of the light absorption composition onto one surface of a near infrared absorption glass substrate and drying it at 140° C. for 60 minutes to form a light absorption layer having a thickness of 3 μm.

Figure 4:
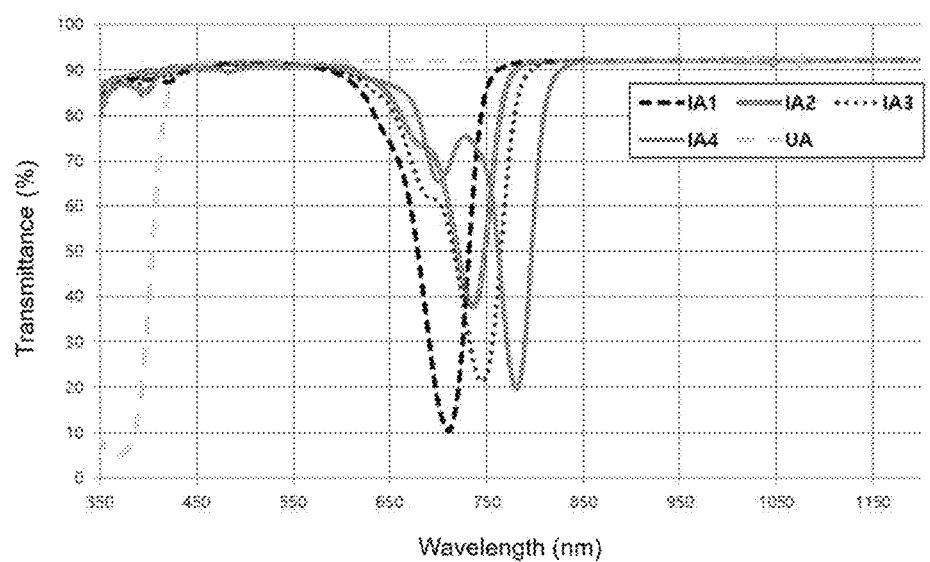
FIG. 4 is a graph showing the transmittance of each absorbent included in a light absorption layer made of a light absorption composition according to an embodiment of the present invention.
Figure 6:
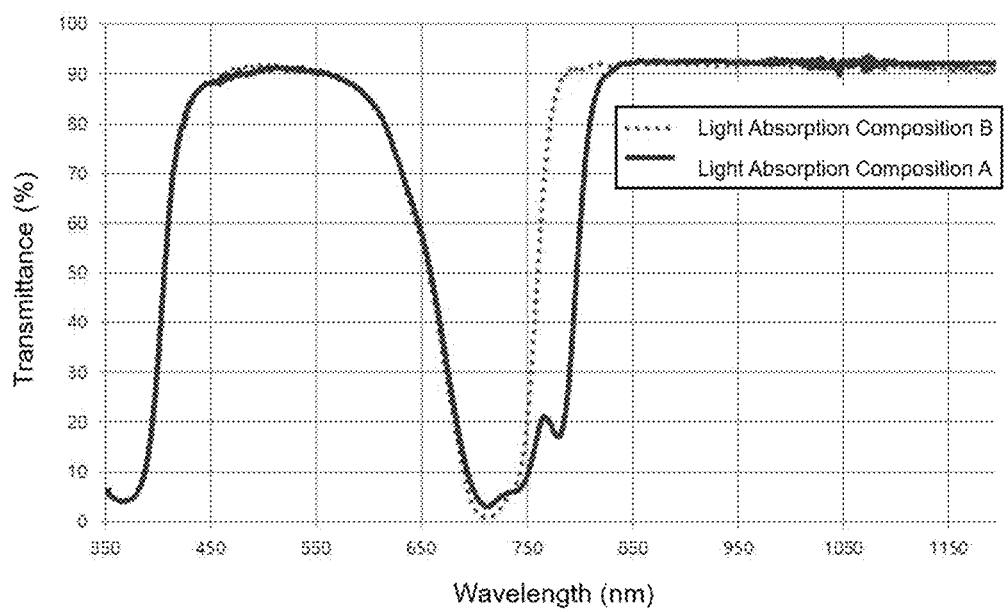
FIG. 6 is a graph showing the transmittance of the light absorption layer made of the light absorption composition according to an embodiment of the present invention and the light absorption layer made of the light absorption composition according to a comparative preparation example.

In the light absorption layer, the OD value of the first near-infrared absorbent (IA1) was about 0.96; the OD value of the second near-infrared absorbent (IA2) was about 0.41; the OD value of the third near-infrared absorbent (IA3) was about 0.64; the OD value of the fourth near-infrared absorbent (IA4) was about 0.7; and the OD value of the ultraviolet absorbent (UA) was about 1.22. In FIG. 4, it can be seen a transmittance graph for each absorbent included in the light absorption composition (the Light Absorption Composition A) according to an embodiment of the present invention. In addition, a graph of the transmittance of the light absorption layer formed of the light absorption composition (the Light Absorption Composition A) according to an embodiment of the present invention can be seen in FIG. 6. The light absorption layer showed an average transmittance of about 84.9% for light in a wavelength region of 400 to 550 nm; an average transmittance of about 14.4% for light in a wavelength region of 700 to 800 nm; an average transmittance of 11.6% for light in a wavelength region of 720 to 780 nm; and a transmittance of 9.17% and the full width at half maximum (FWHM) of about 139 nm for light having a wavelength of 750 nm.

2. Comparative Example A1

A stacked layer structure is formed by depositing a certain amount of the light absorption composition B prepared according to Comparative Preparation Example of the light absorption composition onto one surface of a near-infrared absorption glass substrate and drying it at 140° C. for 60 minutes to form a light absorption layer having a thickness of 3 μm.

Figure 5:
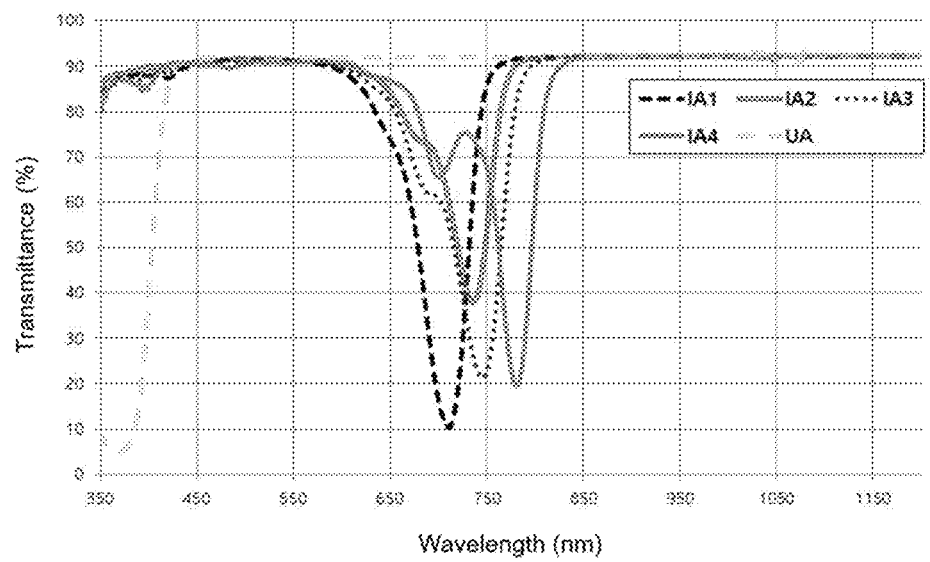
FIG. 5 is a graph showing the transmittance of each absorbent included in a light absorption layer made of a light absorption composition according to a comparative preparation example.

In the light absorption layer, the OD value of the first near-infrared absorbent (IA1) was about 1.52; the OD value of the second near-infrared absorbent (IA2) was about 0.93; and the OD value of the ultraviolet absorbent was about 1.22. FIG. 5 is a graph showing the transmittance of each absorbent included in the light absorption layer made of the light absorption composition (the Light Absorption Composition B) according to Comparative Preparation Example. In addition, in FIG. 6, a graph of the transmittance of the light absorption layer formed of the light absorption composition (the Light Absorption Composition B) according to Comparative Preparation Example can be seen. The light absorption layer showed an average transmittance of about 85.5% for light in a wavelength region of 400 to 550 nm; an average transmittance of about 38.8% for light in a wavelength region of 700 to 800 nm; an average transmittance of 34.2% for light in a wavelength region of 720 to 780 nm; and a transmittance of 19.9% and the full width at half maximum (FWHM) of about 104 nm for light having a wavelength of 750 nm.

Figure 7A:
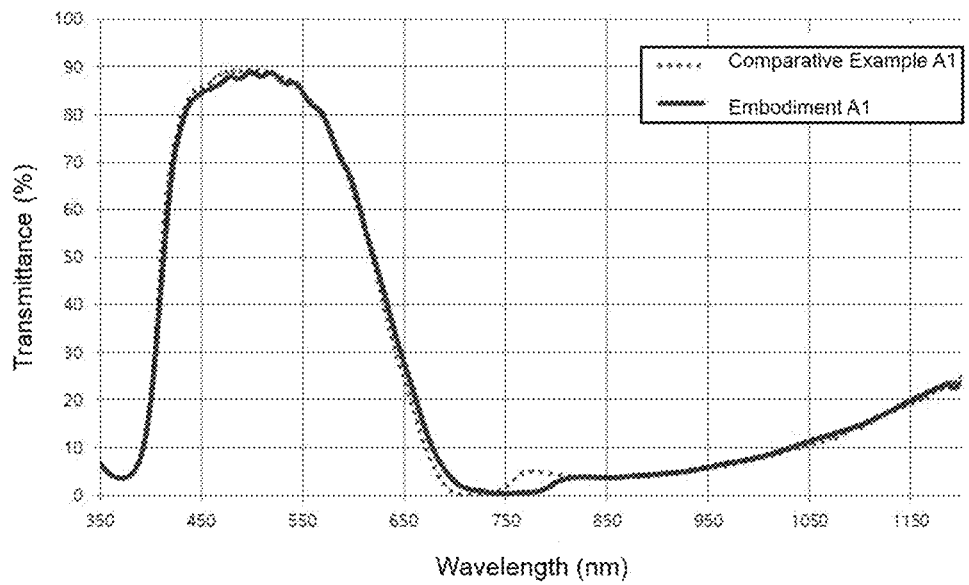
FIGS. 7A and 7B show transmittance graphs for stacked layer structures prepared in Embodiment A1 and Comparative Example A1.
Figure 7B:
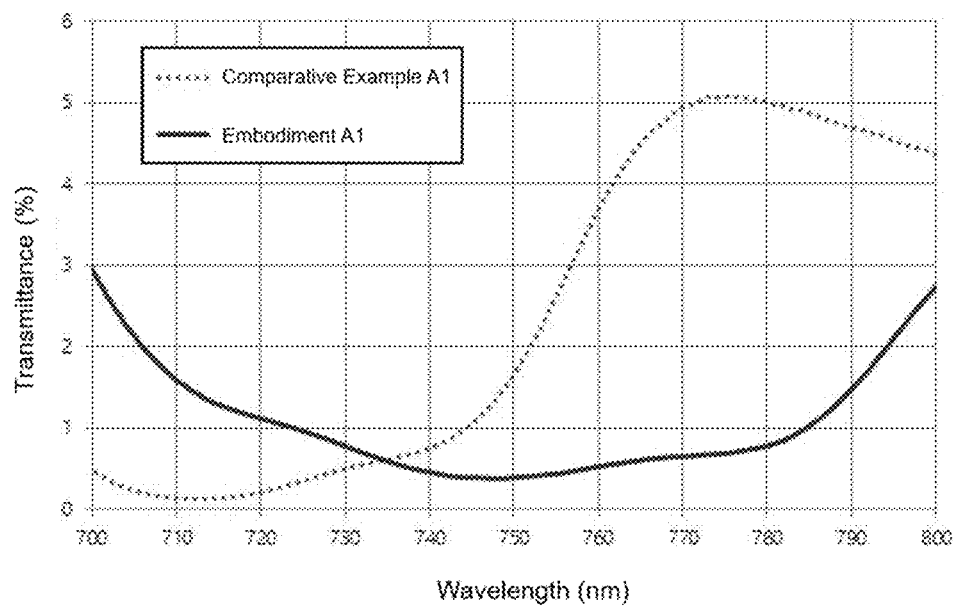

Transmittance characteristic graphs for the stacked layer structures prepared in Embodiment A1 and Comparative Example A1 are shown in FIGS. 7A and 7B.

In addition, the optical properties of the stacked layer structures prepared in Embodiment A1 and Comparative Example A1 are summarized in Table 1 below. In Table 1 below, λ means the wavelength of incident light.

TABLE 1

| Category | Example A1 | Comparative Example A1 |
|---|---|---|
| λ = 720 to 780 nm Average Transmittance | 0.62% | 2.37% |
| λ = 750 nm Transmittance | 0.39% | 1.66% |
| λ = 400 to 550 nm Average Transmittance | 79.6% | 81.1% |
| λ = 750 to 1,000 nm Average Transmittance | 4.15% | 4.71% |
| λ = 720 nm Transmittance | 0.21% | 1.12% |
| λ = 780 nm Transmittance | 5.00% | 0.78% |
| Absolute value of $T_{s1}$ according to General Formula 1 | 0.567% | 8.00% |
| $\lambda_{cut\text{-}off}$ | 619.9 nm | 618.3 nm |
| $\lambda_{cut\text{-}on}$ | 414.4 nm | 409.9 nm |

B. Preparation of Optical Filter (B)

An optical filter (B) was prepared by forming a dielectric multilayer film on both outermost surfaces of the manufactured stacked layer structure (A). The dielectric multilayer film in contact with the near-infrared absorption glass substrate of the stacked layer structure (A) is a first multilayer dielectric film, and the multilayer dielectric film in contact with the light absorption layer of the stacked layer structure (A) is the second multilayer dielectric film.

The first and second dielectric multilayer films were formed while depositing using an ion-beam assisted deposition method. Deposition was performed at $5 \times 10^{-5}$ Torr and 120° C., and an ion beam sputtering (IBS) source voltage of 350 V and current of 850 mA were set. In the above manner, a high refractive index layer: TiO$_2$ layer (Refractive Index of about 2.61 for light having a wavelength of 520 nm) and a low refractive index layer: SiO$_2$ layer (Refractive Index of about 1.46 for light having a wavelength of 520 nm) are alternately formed thereby forming the first and a second dielectric multilayer film, respectively.

For the first dielectric multilayer film, the first dielectric multilayer film according to Preparation Example 1 was prepared in the stacking order as shown in Table 2 below, and the first dielectric multilayer film according to Preparation Example 2 was prepared in the stacking order as shown in Table 3 below. The first multilayer dielectric film according to Comparative Preparation Example was prepared in the stacking order as shown in Table 4 below. In Tables 2 to 4, the layer having the stacking order of 1 is the layer in contact with the near-infrared absorption glass substrate of the stacked layer structure (A).

TABLE 2

| Stacking Order | Material | Thickness (nm) |
|---|---|---|
| 1 | SiO$_2$ | 158.67 |
| 2 | TiO$_2$ | 90.5 |
| 3 | SiO$_2$ | 154.3 |
| 4 | TiO$_2$ | 87.94 |
| 5 | SiO$_2$ | 152.78 |
| 6 | TiO$_2$ | 87.32 |
| 7 | SiO$_2$ | 152.11 |
| 8 | TiO$_2$ | 88.49 |
| 9 | SiO$_2$ | 457.6 |
| 10 | TiO$_2$ | 93.48 |
| 11 | SiO$_2$ | 163.35 |
| 12 | TiO$_2$ | 93.56 |
| 13 | SiO$_2$ | 160.01 |
| 14 | TiO$_2$ | 87.54 |
| 15 | SiO$_2$ | 153.63 |
| 16 | TiO$_2$ | 91.36 |
| 17 | SiO$_2$ | 159.28 |
| 18 | TiO$_2$ | 98.64 |
| 19 | SiO$_2$ | 32.31 |

TABLE 3

| Stacking Order | Material | Thickness (nm) |
|---|---|---|
| 1 | SiO$_2$ | 76.25 |
| 2 | TiO$_2$ | 87.94 |
| 3 | SiO$_2$ | 91.29 |
| 4 | TiO$_2$ | 109.42 |
| 5 | SiO$_2$ | 185.18 |
| 6 | TiO$_2$ | 113.02 |
| 7 | SiO$_2$ | 189.6 |
| 8 | TiO$_2$ | 115.66 |
| 9 | SiO$_2$ | 190.09 |
| 10 | TiO$_2$ | 114.31 |
| 11 | SiO$_2$ | 191.32 |
| 12 | TiO$_2$ | 116.73 |
| 13 | SiO$_2$ | 190.25 |
| 14 | TiO$_2$ | 113.85 |
| 15 | SiO$_2$ | 188.75 |
| 16 | TiO$_2$ | 115.31 |
| 17 | SiO$_2$ | 186.51 |
| 18 | TiO$_2$ | 106.99 |
| 19 | SiO$_2$ | 167.91 |
| 20 | TiO$_2$ | 93.59 |
| 21 | SiO$_2$ | 160.83 |
| 22 | TiO$_2$ | 91.88 |
| 23 | SiO$_2$ | 156.31 |
| 24 | TiO$_2$ | 90.62 |
| 25 | SiO$_2$ | 154.95 |
| 26 | TiO$_2$ | 89.96 |
| 27 | SiO$_2$ | 155.51 |
| 28 | TiO$_2$ | 89.28 |
| 29 | SiO$_2$ | 155.74 |
| 30 | TiO$_2$ | 89.22 |
| 31 | SiO$_2$ | 155.4 |
| 32 | TiO$_2$ | 90.1 |
| 33 | SiO$_2$ | 155.46 |
| 34 | TiO$_2$ | 91.87 |
| 35 | SiO$_2$ | 157.56 |
| 36 | TiO$_2$ | 94.48 |
| 37 | SiO$_2$ | 167.73 |
| 38 | TiO$_2$ | 105.13 |
| 39 | SiO$_2$ | 39.75 |
| 40 | TiO$_2$ | 8.82 |
| 41 | SiO$_2$ | 102.45 |

TABLE 4

| Stacking Order | Material | Thickness (nm) |
|---|---|---|
| 1 | SiO$_2$ | 76.25 |
| 2 | TiO$_2$ | 87.94 |
| 3 | SiO$_2$ | 91.29 |
| 4 | TiO$_2$ | 109.42 |
| 5 | SiO$_2$ | 185.18 |
| 6 | TiO$_2$ | 113.02 |
| 7 | SiO$_2$ | 189.6 |
| 8 | TiO$_2$ | 115.66 |
| 9 | SiO$_2$ | 190.09 |
| 10 | TiO$_2$ | 114.31 |
| 11 | SiO$_2$ | 191.32 |
| 12 | TiO$_2$ | 116.73 |
| 13 | SiO$_2$ | 190.25 |
| 14 | TiO$_2$ | 113.85 |
| 15 | SiO$_2$ | 188.75 |
| 16 | TiO$_2$ | 115.31 |
| 17 | SiO$_2$ | 186.51 |
| 18 | TiO$_2$ | 106.99 |
| 19 | SiO$_2$ | 167.91 |
| 20 | TiO$_2$ | 93.59 |
| 21 | SiO$_2$ | 160.83 |
| 22 | TiO$_2$ | 91.88 |
| 23 | SiO$_2$ | 156.31 |
| 24 | TiO$_2$ | 90.62 |
| 25 | SiO$_2$ | 154.95 |
| 26 | TiO$_2$ | 89.96 |
| 27 | SiO$_2$ | 155.51 |
| 28 | TiO$_2$ | 89.28 |
| 29 | SiO$_2$ | 155.74 |
| 30 | TiO$_2$ | 89.22 |
| 31 | SiO$_2$ | 155.4 |
| 32 | TiO$_2$ | 90.1 |
| 33 | SiO$_2$ | 155.46 |
| 34 | TiO$_2$ | 91.87 |
| 35 | SiO$_2$ | 157.56 |
| 36 | TiO$_2$ | 94.48 |
| 37 | SiO$_2$ | 167.73 |
| 38 | TiO$_2$ | 105.13 |
| 39 | SiO$_2$ | 39.75 |
| 40 | TiO$_2$ | 8.82 |
| 41 | SiO$_2$ | 102.45 |

Figure 8A:
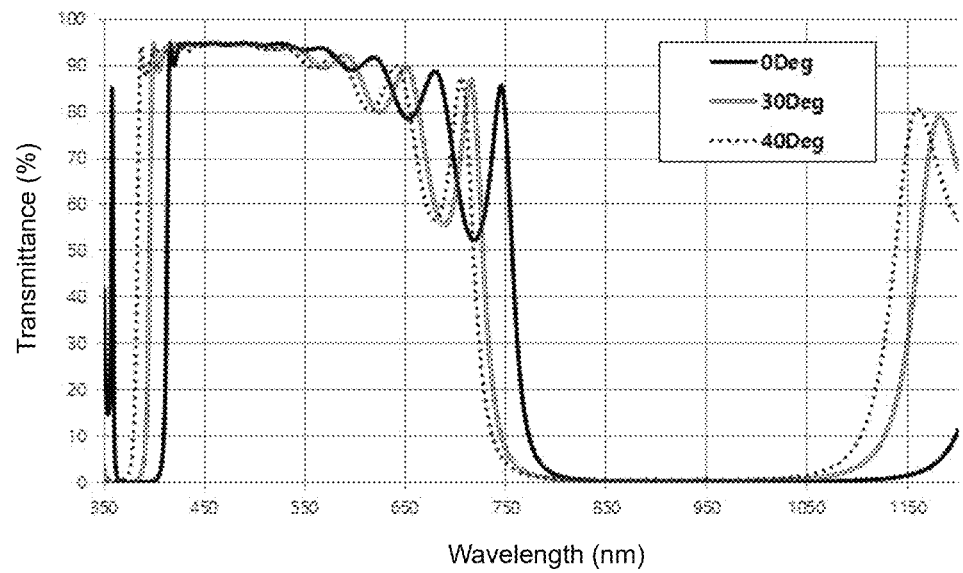
FIG. 8A is a graph showing the transmittance of a first multilayer dielectric film according to Preparation Example 1.
Figure 8B:
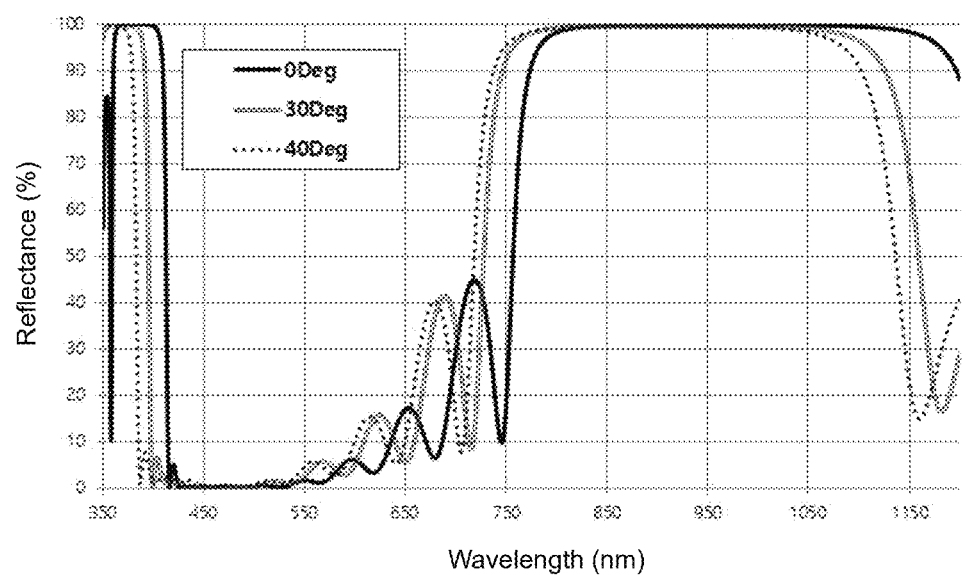
FIG. 8B is a graph showing the reflectance of the first multilayer dielectric film according to Preparation Example 1 (angle (Deg) means an incident angle of incident light).
Figure 9A:
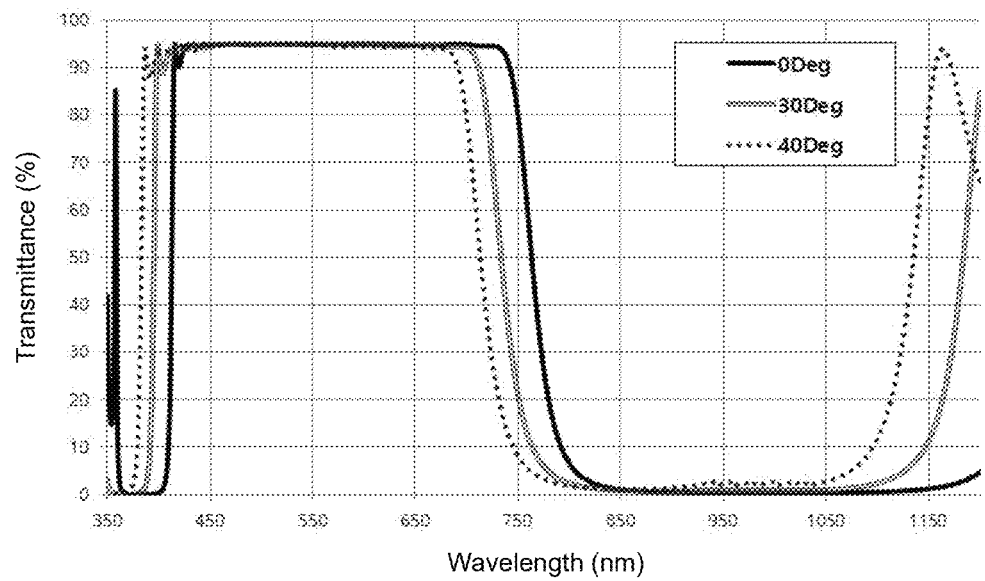
FIG. 9A is a graph showing the transmittance of a first multilayer dielectric film according to Preparation Example 2.
Figure 9B:
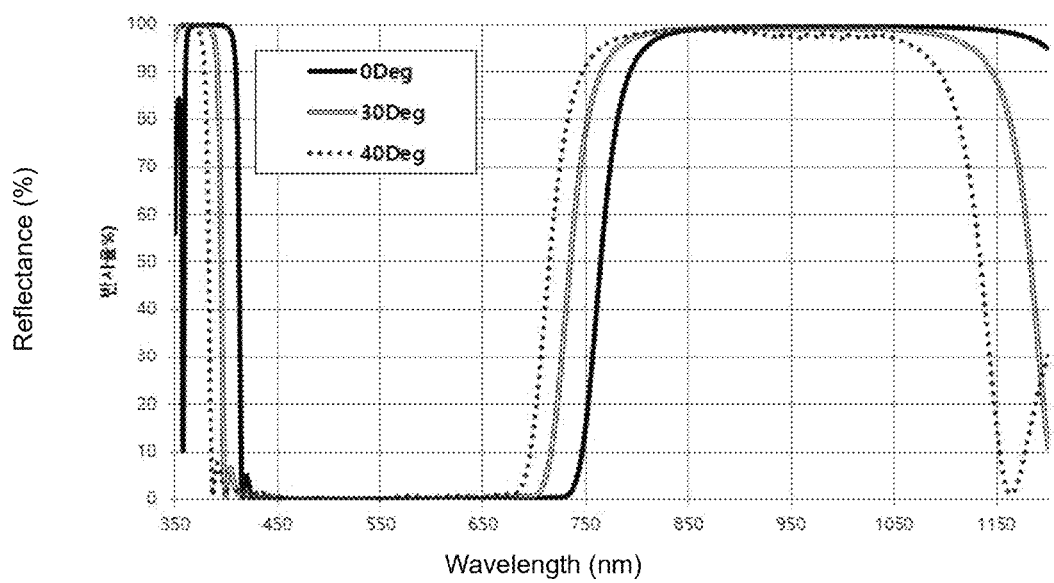
FIG. 9B is a graph showing the reflectance of the first multilayer dielectric film according to Preparation Example 2 (angle (Deg) means an incident angle of incident light).
Figure 10A:
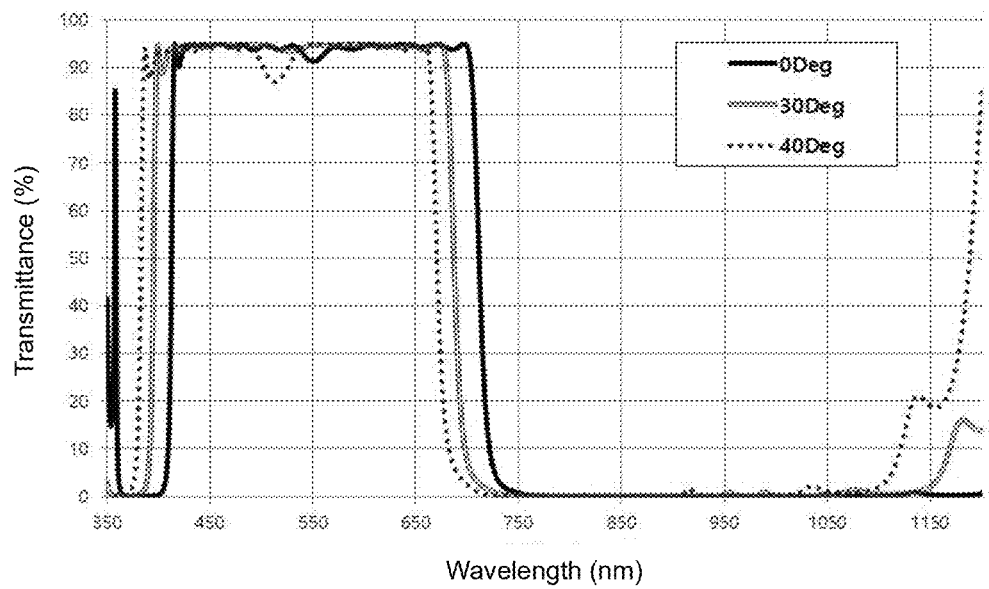
FIG. 10A is a graph showing the transmittance of a first multilayer dielectric film according to a comparative example.
Figure 10B:
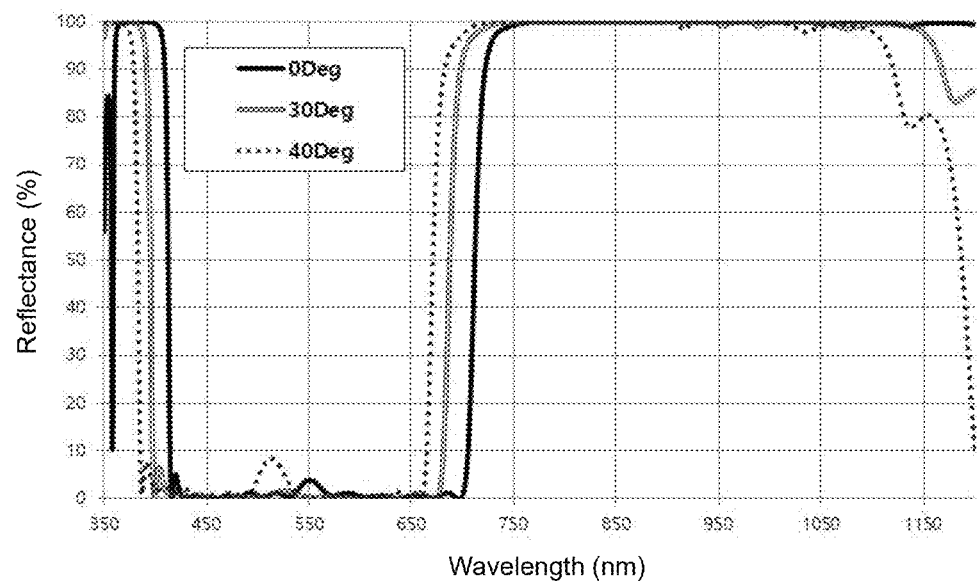
FIG. 10B is a graph showing the reflectance of the first multilayer dielectric film according to the comparative example (angle (Deg) means an incident angle of incident light).

The transmittance graph of the first dielectric multilayer film according to Preparation Example 1 prepared in the stacking order as shown in Table 2 is shown in FIG. 8A, and the reflectance graph is shown in FIG. 8B. In addition, the transmittance graph of the first dielectric multilayer film according to Preparation Example 2 prepared in the stacking order as shown in Table 3 is shown in FIG. 9A, and the reflectance graph is shown in FIG. 9B. In addition, the transmittance graph of the first dielectric multilayer film according to the Comparative Example prepared in the stacking order as shown in Table 4 is shown in FIG. 10A, and the reflectance graph is shown in FIG. 10B.

The optical properties of the first multilayer dielectric films according to Preparation Examples 1 and 2 and the first multilayer dielectric films according to Comparative Examples are summarized in Table 5 below. In Table 5 below, λ means the wavelength of incident light.

TABLE 5

| Category: First Dielectric Multilayer Film | Preparation Example 1 | Preparation 2 | Comparative Example |
|---|---|---|---|
| $\lambda_{R,\,cut\text{-}off}$ | 756.8 nm | 764.4 nm | 711.9 nm |
| $\lambda_{R,\,30°/cut\text{-}off}$ | 727.6 nm | 734.6 nm | 687.5 nm |
| $\lambda_{R,\,40°/cut\text{-}off}$ | 719 nm | 714.5 nm | 670.9 nm |
| $\lambda$ = 750 to 1,000 nm Average Transmittance (0°) | 4.14% | 7.64% | 0.05% |
| $\lambda$ = 750 to 1,000 nm Average Transmittance (30°) | 0.83% | 2.34% | 0.11% |
| $\lambda$ = 750 to 1,000 nm Average Transmittance (40°) | 0.78% | 2.13% | 0.15% |
| $\lambda$ = 700 to 750 nm Average Transmittance (0°) | 64.2% | 92.7% | 25.6% |

Referring to Table 5, $\lambda_{R,\,cut\text{-}off}$ and $\lambda_{R,\,n/cut\text{-}off}$ for the first dielectric multilayer film according to the comparative example are not included within the prescribed range, and thus the subject samples reflect near-infrared light that generates red flares thereby generating red flares.

In addition, the second multilayer dielectric film was prepared in the stacking order as shown in Table 6 below as the second multilayer dielectric film according to Preparation Example. In Table 6 below, the layer having the stacking order of 1 is the layer in contact with the light absorption layer of the stacked layer structure (A).

TABLE 6

| Stacking Order | Material | Thickness (nm) |
|---|---|---|
| 1 | $SiO_2$ | 98.9 |
| 2 | $TiO_2$ | 28.54 |
| 3 | $SiO_2$ | 12.01 |
| 4 | $TiO_2$ | 76.08 |
| 5 | $SiO_2$ | 23.1 |
| 6 | $TiO_2$ | 24.54 |
| 7 | $SiO_2$ | 56.53 |
| 8 | $TiO_2$ | 8.31 |
| 9 | $SiO_2$ | 44.33 |

Figure 11A:
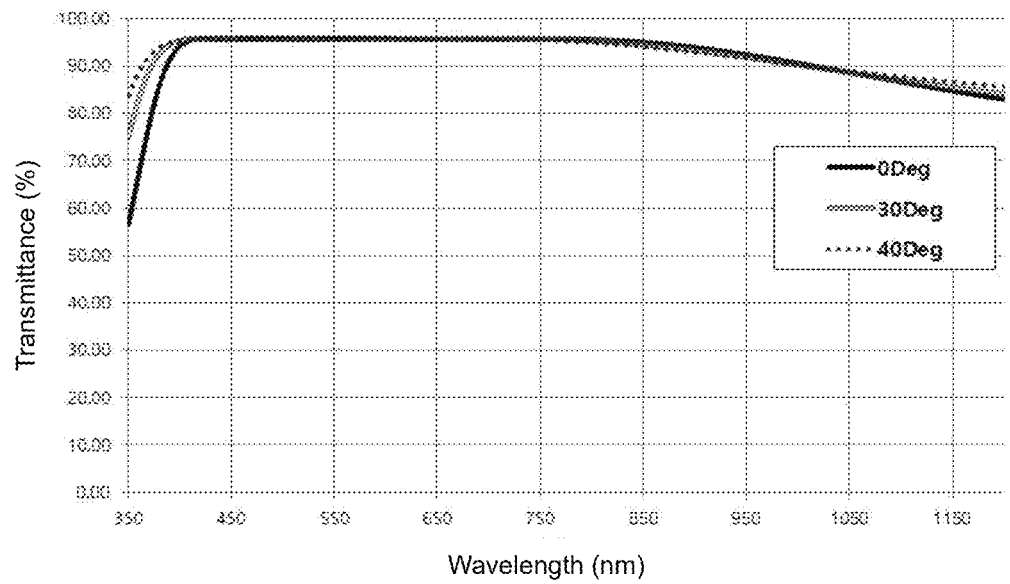
FIG. 11A is a graph showing the transmittance of a second multilayer dielectric film according to a preparation example.
Figure 11B:
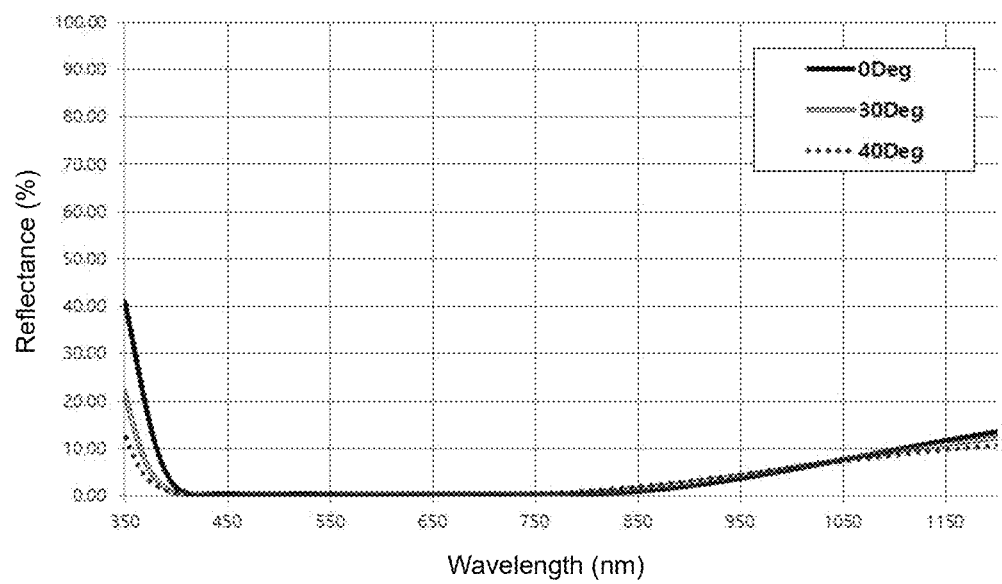
FIG. 11B is a graph showing the reflectance of the second multilayer dielectric film according to the preparation example (angle (Deg) means an incident angle of incident light).

The transmittance graph of the second dielectric multilayer film according to the Preparation Example prepared in the stacking order as shown in Table 6 is shown in FIG. 11A, and the reflectance graph is shown in FIG. 11B.

In addition, the optical characteristics of the second dielectric multilayer film according to the above Preparation Example are summarized in Table 7 below. In Table 7 below, λ means the wavelength of incident light.

TABLE 7

| Category: Second Dielectric Multilayer Film | Preparation Example |
|---|---|
| $\lambda$ = 750 to 1,000 nm Average Transmittance (0°) | 94.1% |
| $\lambda$ = 750 to 1,000 nm Average Transmittance (30°) | 93.6% |
| $\lambda$ = 750 to 1,000 nm Average Transmittance (40°) | 93.3% |
| $\lambda$ = 450 to 750 nm Average Reflectance (0°) | 0.35% |
| $\lambda$ = 450 to 750 nm Average Reflectance (30°) | 0.15% |
| $\lambda$ = 450 to 750 nm Average Teflectance (40°) | 0.17% |

1. Embodiment B1

Figure 12:
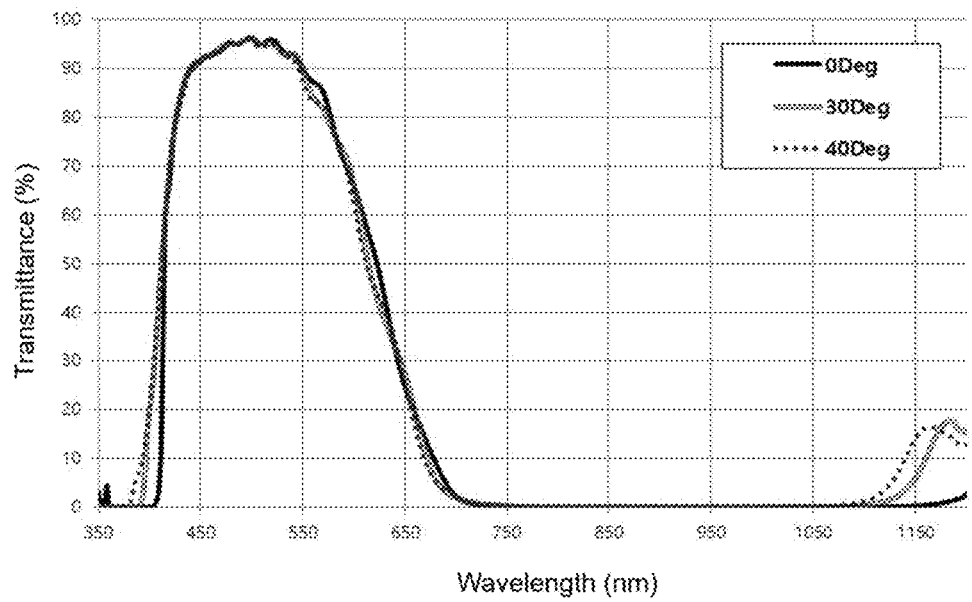
FIG. 12 is a graph showing the transmittance of an optical filter manufactured according to Embodiment B1 (angle (Deg) means an angle of incidence of incident light).

An optical filter was prepared by forming a first multilayer dielectric film according to Preparation Example 1 on the stacked layer structure prepared according to Embodiment A1 and forming a second multilayer dielectric film according to Preparation Example. The transmittance graph of the optical filter prepared according to Embodiment B1 is shown in FIG. 12.

2. Embodiment B2

Figure 13:
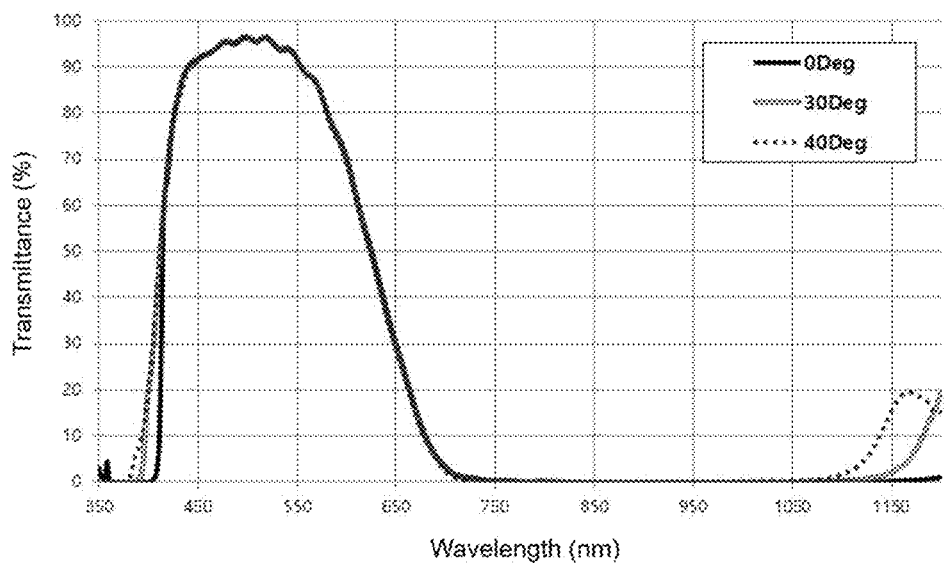
FIG. 13 is a graph showing the transmittance of an optical filter manufactured according to Embodiment B2 (angle (Deg) means the angle of incidence of incident light).
Figure 14:
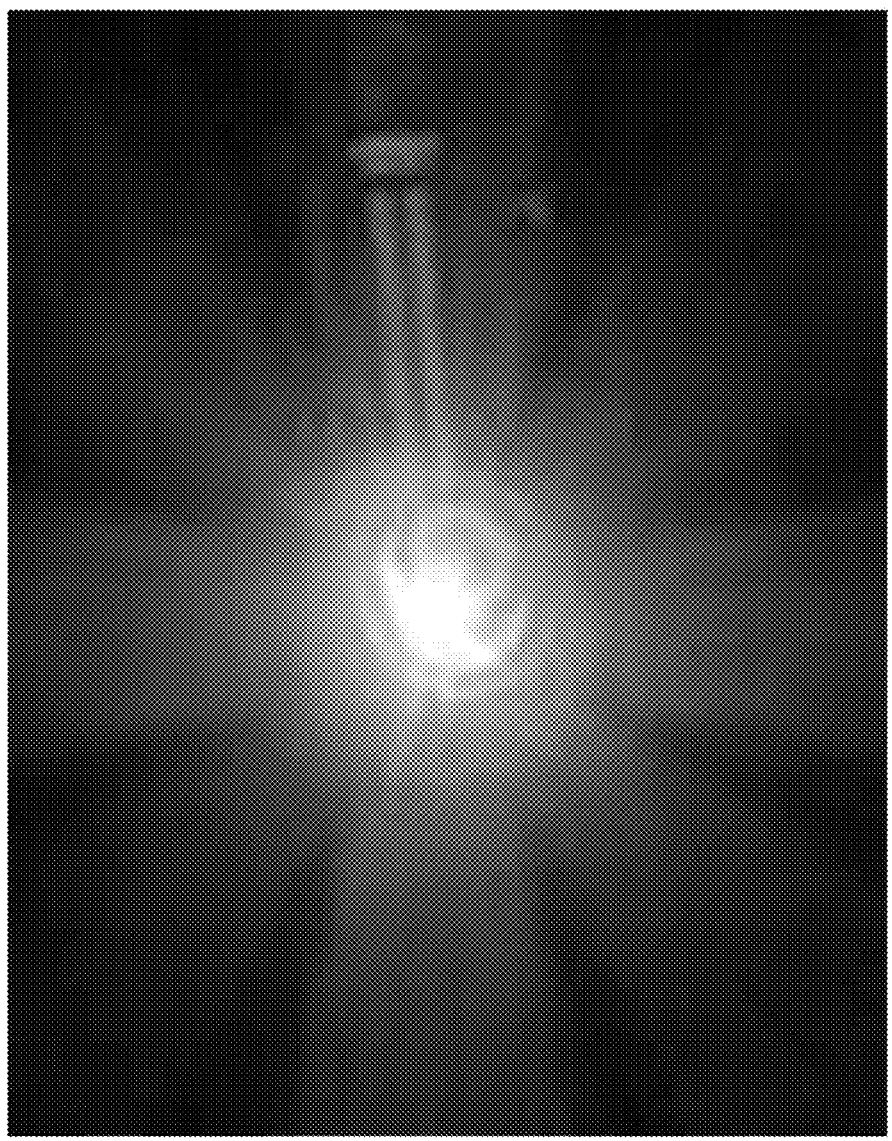
FIG. 14 shows an example of an image taken by applying the optical filter prepared according to Example B2.

An optical filter was prepared by forming a first multilayer dielectric film according to Preparation Example 2 on the stacked layer structure prepared according to Example A1 and forming a second multilayer dielectric film according to Preparation Example. The transmittance graph of the optical filter prepared according to Embodiment B2 is shown in FIG. 13. Also, an image taken under the following shooting conditions is shown in FIG. 14.

[Shooting Conditions]

Using a rear camera equipped with the optical filter, a halogen LED light source having a color temperature of 3,100K was used as an object, and the distance between the rear camera and the light source was 50 cm, and a photo was taken in a dark room. The photo was taken within a range of 1 m radius around the light source.

The RGB values for the darkroom were 11, 11 and 9, respectively. Also, in the image according to FIG. 14, the RGB values of the points having the smallest R values were 9, 11, and 8, respectively, and the RGB values of the points having the largest R values were 39, 40, and 42, respectively. Because the absolute value of the difference between the R value between the point with the largest R value and the point with the smallest R value is about 30, it can be seen that the flare phenomenon does not occur. In addition, because the absolute values of the difference between the R value and the G value and the difference between the R value and the B value at the point where the R value is the largest are about 1 and about 3, respectively, it can be seen that the flare phenomenon does not occur. Referring to FIG. 14, it can be seen that the flare phenomenon is prevented.

3. Comparative Example B1

Figure 15:
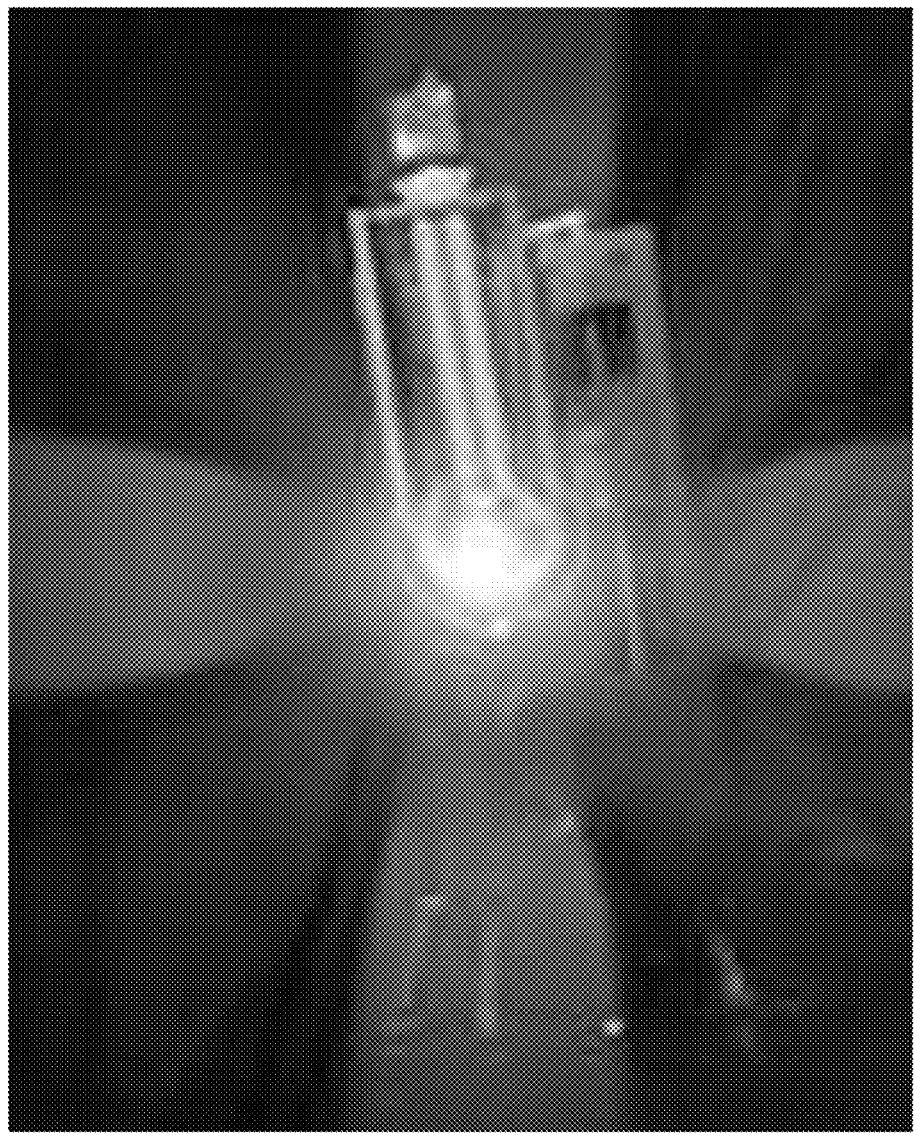
FIG. 15 shows an example of an image taken by applying an optical filter prepared according to Comparative Example B1.

An optical filter was prepared by forming a first multilayer dielectric film according to Comparative Example on the stacked layer structure prepared according to Embodiment A1 and forming a second multilayer dielectric film according to Preparation Example. An image taken under the following shooting conditions using the optical filter prepared according to Comparative Example B1 is shown in FIG. 15.

[Shooting Conditions]

Using the rear camera equipped with the optical filter, a halogen LED light source having a color temperature of 3,100K was used as an object, and the distance between the rear camera and the light source was 50 cm, and a photo was taken in a dark room. The photo is taken within a range of 1 m radius around the light source.

The RGB values for the darkroom were 11, 11 and 9, respectively. In addition, in an image according to FIG. 15, the RGB values of the points having the smallest R values were 10, 12, and 9, respectively, and the RGB values of the points having the largest R values were 136, 43, and 28, respectively. Because the absolute value of the difference between the R value at the point with the largest R value and the point with the smallest R value exceeds 100, it can be seen that the flare phenomenon has occurred. In addition, because the absolute values of the difference between the R value and the G value and the difference between the R value and the B value at the point where the R value is the largest are about 93 and about 108, respectively, it can be seen that the flare phenomenon has occurred. Referring to FIG. 15, it can be confirmed that a flare phenomenon has occurred.

4. Comparative Example B2

Figure 16:
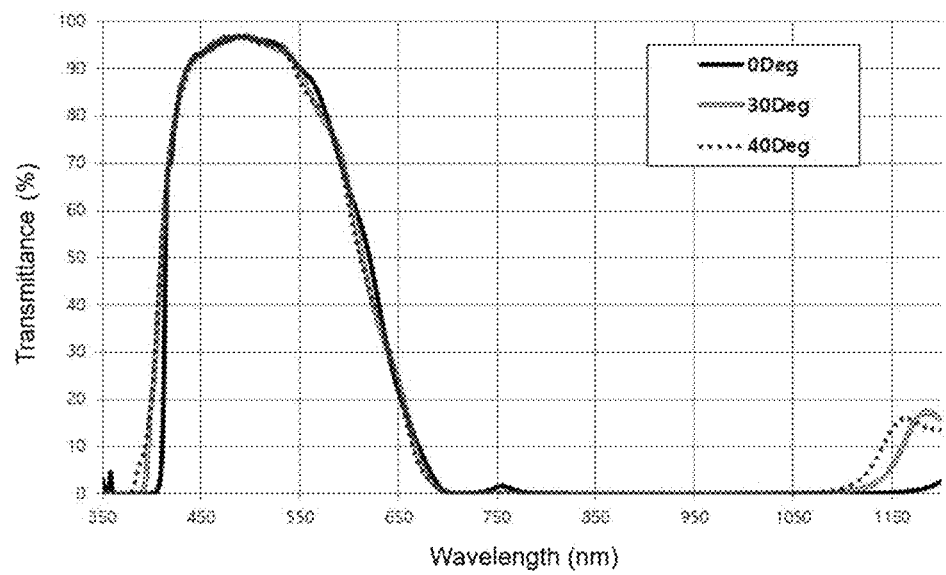
FIG. 16 is a graph showing the transmittance of an optical filter manufactured according to Comparative Example B2 (angle (Deg) means an incident angle of incident light).

An optical filter was prepared by forming a first multilayer dielectric film according to Preparation Example 1 on the stacked layer structure prepared according to Comparative Example A1 and forming a second multilayer dielectric film according to Preparation Example. The transmittance graph of the optical filter prepared according to Comparative Example B2 is shown in FIG. 16.

5. Comparative Example B3

Figure 17:
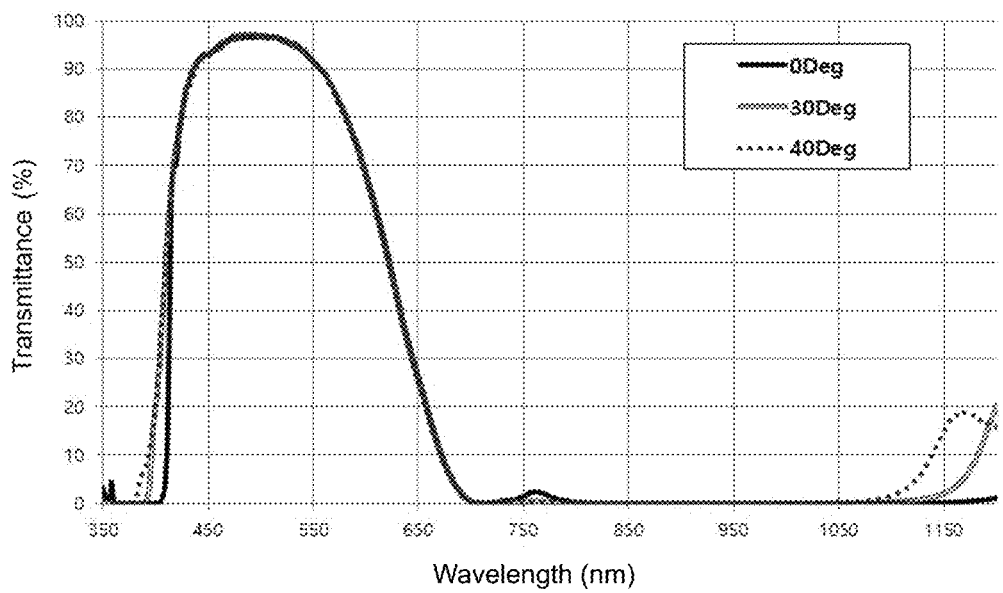
FIG. 17 is a graph showing the transmittance of an optical filter manufactured according to Comparative Example B3 (angle (Deg) means an incident angle of incident light).

An optical filter was prepared by forming a first multilayer dielectric film according to Preparation Example 2 on the stacked layer structure prepared according to Comparative Example A1 and forming a second multilayer dielectric film according to Preparation Example. The transmittance graph of the optical filter prepared according to Comparative Example B3 is shown in FIG. 17.

The optical properties of the optical filters according to Embodiments B1 and B2 and the optical filters according to Comparative Examples B2 and B3 are summarized in Tables 8 and 9, respectively. In Tables 8 and 9, A means the wavelength of incident light.

TABLE 8

| Category: Optical Filter | Example B1 | Example B2 |
|---|---|---|
| λ = 730 to 780 nm Maximum Transmittance | 0.53% | 0.83% |
| λ = 730 to 780 nm Average Transmittance | 0.27% | 0.11% |
| λ = 430 to 565 nm Average Transmittance | 92.8% | 93.2% |
| λ = 430 to 565 nm Minimum Transmittance | 94.0% | 84.0% |
| λ = 700 to 725 nm Average Transmittance | 1.07% | 1.74% |
| λ = 800 to 1,000 nm Average Transmittance | 0.0179% | 0.0487% |
| $\lambda_{F,\ cut-on}$ | 414.3 nm | 414.3 nm |
| $\lambda_{F,\ cut-off}$ | 622.7 nm | 625.3 nm |
| $\lambda_{30,\ cut-off}$ according to General Formula 2 | 8.5 nm | 1.4 nm |
| $\lambda_{40,\ cut-off}$ according to General Formula 2 | 10.6 nm | 2.2 nm |

TABLE 9

| Category: Optical Filter | Comparative Example B2 | Comparative Example B3 |
|---|---|---|
| λ = 730 to 780 nm Maximum Transmittance | 1.66% | 2.45% |
| λ = 730 to 780 nm Average Transmittance | 0.93% | 0.35% |
| λ = 430 to 565 nm Average Transmittance | 93.7% | 94.1% |
| λ = 430 to 565 nm Minimum Transmittance | 86.5% | 86.5% |
| λ = 700 to 725 nm Average Transmittance | 0.15% | 0.25% |
| λ = 800 to 1,000 nm Average Transmittance | 0.0184% | 0.0516% |
| $\lambda_{F,\ cut-on}$ | 413.9 nm | 413.9 nm |
| $\lambda_{F,\ cut-off}$ | 620.8 nm | 622.6 nm |
| $\lambda_{30,\ cut-off}$ according to General Formula 2 | 7.3 nm | 1.1 nm |
| $\lambda_{40,\ cut-off}$ according to General Formula 2 | 9.6 nm | 2.6 nm |

Referring to Table 8, in Embodiments B1 and B2, the maximum transmittance for light in the wavelength region of 730 to 780 nm did not exceed 1%, and the average transmittance to light in the wavelength region of 730 to 780 nm also did not exceed 0.5%. On the other hand, referring to Table 9, Comparative Examples B2 and B3 had the maximum transmittance of light in the wavelength range of 730 to 780 nm exceeding 1%, and Comparative Example B2 had the average transmittance of light in the wavelength range of 730 to 780 nm also exceeding 0.5%.

Therefore, it can be seen that Embodiments B1 and B2 prevent a flare phenomenon to obtain an image similar to the one that of a human eye can see, and it can be seen that problem Comparative Examples B2 and B3 have a problem in the image due to the secondary peak.

The illustrated and above-describe embodiments for a stacked layer structure, an optical filter and an image capturing device including the stacked layer structure and the optical filter are not intended to be limiting in any way, and any such modifications to the embodiments described are intended to be included within the spirit and scope of the present invention and protected by the claims that follow.

What is claimed is:

1. A stacked layer structure comprising:
a near-infrared absorption glass substrate; and
a light absorption layer including a near-infrared absorbent,
wherein the near-infrared absorbent includes a first near-infrared absorbent having an absorption maximum wavelength in a range of 700 nm or more to 720 nm or less, a second near-infrared absorbent having an absorption maximum wavelength in a range of more than 720 nm to 740 nm or less, a third near-infrared absorbent having an absorption maximum wavelength in a range of more than 740 nm to 760 nm or less, and a fourth near-infrared absorbent having an absorption maximum wavelength in a range of more than 760 nm to 800 nm or less; and
wherein the light absorption layer has a full width half maximum of 120 nm or more for a light is in a wavelength range of 300 to 1,200 nm; and
wherein the stacked layer structure has an average transmittance of 1% or less for a light in a wavelength range of 720 to 780 nm.

2. The stacked layer structure of claim 1, wherein a transmittance for a light at a wavelength of 750 nm is 1% or less.

3. The stacked layer structure of claim 1, wherein an absolute value of Ts1 according to the following General Formula (1) is 1% or less:

$$Ts1=(T780-T720)/(780-720)\times100 \quad \text{[General Formula(1)]}$$

wherein T780 means a transmittance for a light at a wavelength of 780 nm, and T720 means a transmittance for a light at a wavelength of 720 nm in the General Formula (1).

4. The stacked layer structure of claim 1, wherein an average transmittance for a light in a wavelength range of 400 to 550 nm is 70% or more, and an average transmittance for a light in a wavelength range of 750 to 1,000 nm is 5% or less.

5. The stacked layer structure of claim 1, wherein a wavelength ($\lambda_{cut-off}$) of a light having a transmittance of 50% for a light in a wavelength range of 500 to 750 nm is in a range of 600 to 640 nm.

6. The stacked layer structure of claim 1 wherein the near-infrared absorption glass substrate contains $Cu^{2+}$ in an amount of 1 to 10% by weight with respect to the total weight.

7. The stacked layer structure of claim 1, wherein the near infrared absorption glass substrate has an average transmittance of 80% or more for a light in a wavelength range of 400 to 550 nm, and an average transmittance of 10% or less for a light in a wavelength range of 750 to 1,000 nm.

8. The stacked layer structure of claim 1, wherein the light absorption layer has an average transmittance of 20% or less for a light in a wavelength range of 700 to 800 nm.

9. The stacked layer structure of claim 1, wherein an optical density (OD) value of the first near-infrared absorbent included in the light absorption layer is in a range of 0.5 to 1.2, an OD value of the second near-infrared absorbent is in a range of 0.2 to 0.6, an OD value of the third near-infrared absorbent is in a range of 0.4 to 1.0, and an OD value of the fourth absorbent is in a range of 0.5 to 1.1.

10. The stacked layer structure of claim 9, wherein a summed OD value of the near-infrared absorbents included in the light absorption layer is in a range of 2 to 3.

11. The stacked layer structure of claim 1, wherein the near-infrared absorbent includes one or more selected from a group consisting of a squarylium-based compound, a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound and an anthraquinone-based compound.

12. The stacked layer structure of claim 1, wherein the light absorption layer further comprises an ultraviolet absorbent.

13. The stacked layer structure of claim 12, wherein the ultraviolet absorbent includes one or more selected from a group consisting of a benzotriazole-based compound, a triazine-based compound, a benzophenone-based compound, an oxazole-based compound, a melocyanine-based compound, a cyanine-based compound, a naphthalimide-based compound, an oxadiazole-based compound, an oxazine-based compound, an oxazolidine-based compound, a naphthalic acid-based compound, a styryl-based compound, an anthracene-based compound, a circular carbonyl-based compound, an azomethine-based compound, an indole-based compound, a cyanoacrylate-based compound, an oxyanilide-based compound, and a triazole-based compound.

14. An optical filter comprising:
a near-infrared absorption glass substrate;
a light absorption layer; and
a dielectric multilayer film,
wherein the dielectric multilayer film has an average transmittance of 50% or more for a light in a wavelength range of 700 to 750 nm,
wherein a RGB value is extracted with a color picker tool for a photo, and an absolute value of the difference of a R value between a point with the smallest R value and a point with the largest R value in the photo is within the range of 0 to 50,
wherein the photo is taken by using a rear camera equipped with the optical filter, a halogen LED light source having a color temperature of 3,100K is used as an object, and a distance between the rear camera and the light source is 50 cm, and the photo is taken in a dark room.

15. The optical filter of claim 14, wherein an absolute value of the difference between the R value and the G value at a point where the R value is the largest with respect to the RGB values extracted from the photographed picture is in the range of 0 to 50, and an absolute value of the difference between the R value and the B value is in the range of 0 to 50.

16. An optical filter comprising:
a near-infrared absorption glass substrate;
a light absorption layer; and
a dielectric multilayer film,
wherein the dielectric multilayer film includes a first dielectric multilayer film located on one side of the outermost surfaces of the optical filter and a second dielectric multilayer film located on the other side of the outermost surfaces of the optical filter,
wherein the first dielectric multilayer film has a wavelength ($\lambda_{R,\ cut\text{-}off}$) of a light with a reflectivity of 50% for a light in a wavelength range of 600 to 850 nm being in a range of 750 to 780 nm and an average transmittance of 10% or less for a light in a wavelength range of 750 to 1,000 nm; and the second dielectric multilayer film has an average transmittance of 90% or more for a light in a wavelength range of 750 to 1,000 nm and a maximum transmittance of 1% or less for a light in a wavelength range of 730 to 780 nm.

17. The optical filter of claim 16, wherein the second multilayer dielectric film has an average reflectance of 1% or less for a light in a wavelength range of 450 to 750 nm.

* * * * *